US011507752B1

(12) United States Patent
Bhowmik et al.

(10) Patent No.: US 11,507,752 B1
(45) Date of Patent: Nov. 22, 2022

(54) EVALUATING NATURAL LANGUAGE PROCESSING COMPONENTS

(71) Applicant: Amazon Technologies, Inc., Seattle, WA (US)

(72) Inventors: Pavel Bhowmik, Seattle, WA (US); Melanie C B Gens, Seattle, WA (US); Sachin Midha, Bothell, WA (US); Rahul Gupta, Waltham, MA (US); Sriram Venkatapathy, Belmont, MA (US); Xinhong Zhang, Mercer Island, WA (US); Anoop Kumar, Fountain Valley, CA (US); Pooja Sanjay Sonawane, Seattle, WA (US); Samuel Harry Ingbar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 207 days.

(21) Appl. No.: 17/002,862

(22) Filed: Aug. 26, 2020

(51) Int. Cl.
| G06F 17/00 | (2019.01) |
| G06F 40/30 | (2020.01) |
| G10L 15/18 | (2013.01) |
| G10L 15/22 | (2006.01) |

(52) U.S. Cl.
CPC .......... *G06F 40/30* (2020.01); *G10L 15/1822* (2013.01); *G10L 2015/223* (2013.01)

(58) Field of Classification Search
None
See application file for complete search history.

(56) References Cited

U.S. PATENT DOCUMENTS

| 9,633,317 | B2 * | 4/2017 | Gabel | G06N 5/022 |
| 10,811,013 | B1 * | 10/2020 | Seeker-Walker | G10L 15/22 |
| 2019/0213999 | A1 * | 7/2019 | Grupen | G06F 3/167 |
| 2019/0278841 | A1 * | 9/2019 | Pusateri | G10L 15/26 |
| 2020/0380389 | A1 * | 12/2020 | Eldeeb | G06F 40/284 |

* cited by examiner

*Primary Examiner* — Satwant K Singh
(74) *Attorney, Agent, or Firm* — Pierce Atwood LLP

(57) ABSTRACT

Techniques for evaluating a natural language understanding (NLU) component and determining an action to resolve an issue processing a user input are described. The system determines which component is invoked by a baseline NLU component is processing the user input, and which component is invoked by an updated NLU component. Based on that information, the system selects the action to resolve the updated NLU component generating an undesired response to the user input.

20 Claims, 17 Drawing Sheets

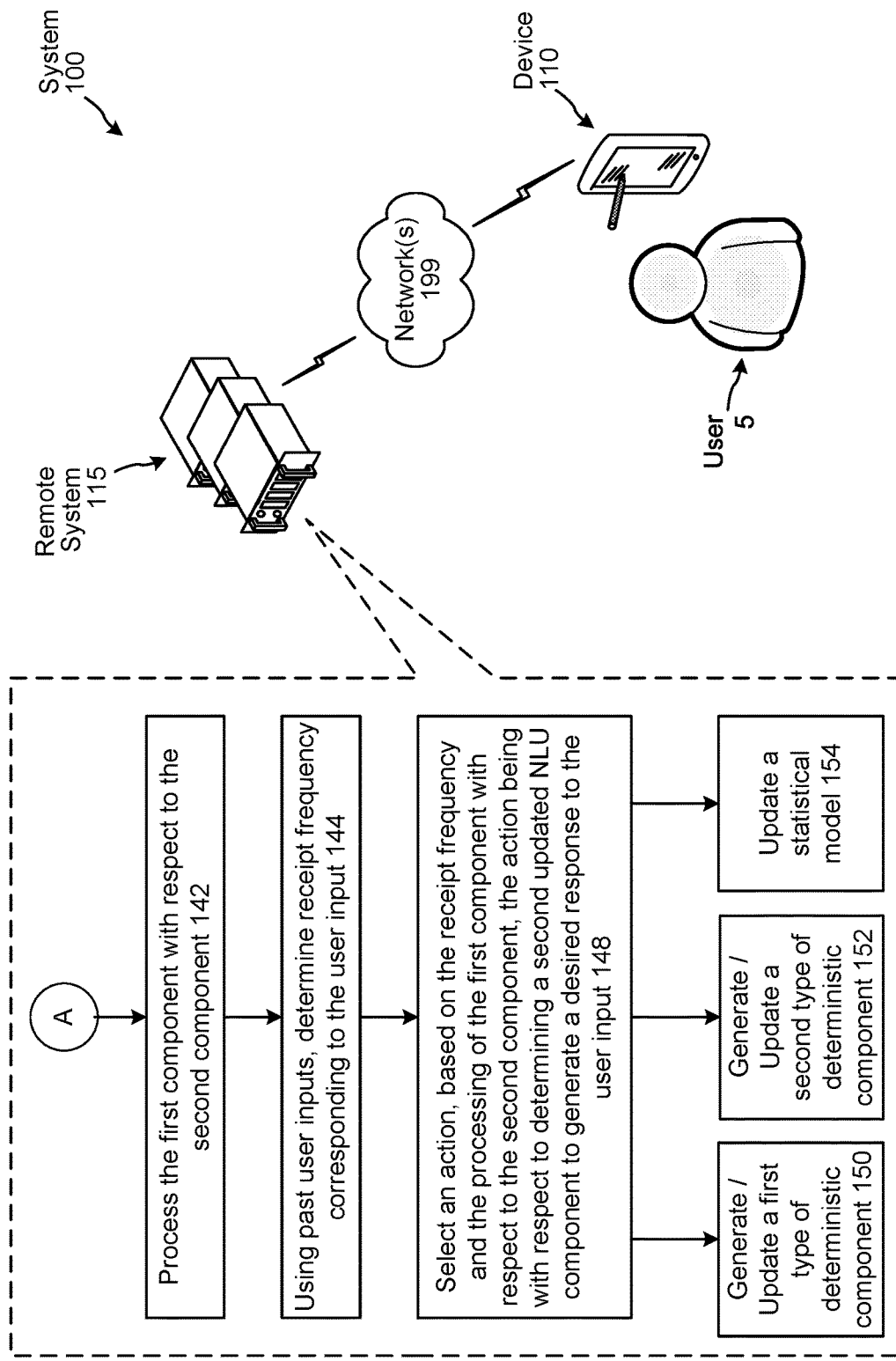

EVALUATING NATURAL LANGUAGE PROCESSING COMPONENTS

BACKGROUND

Natural language processing systems have progressed to the point where humans can interact with computing devices using their voices and natural language textual inputs. Such systems employ techniques to identify the words spoken and typed by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately herein as natural language processing (NLP). NLP may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 1A and 1B are conceptual diagrams illustrating a system configured to determine an action to resolve issues with updated NLU components, according to embodiments of the present disclosure.

DETAILED DESCRIPTION

Figure 1A:
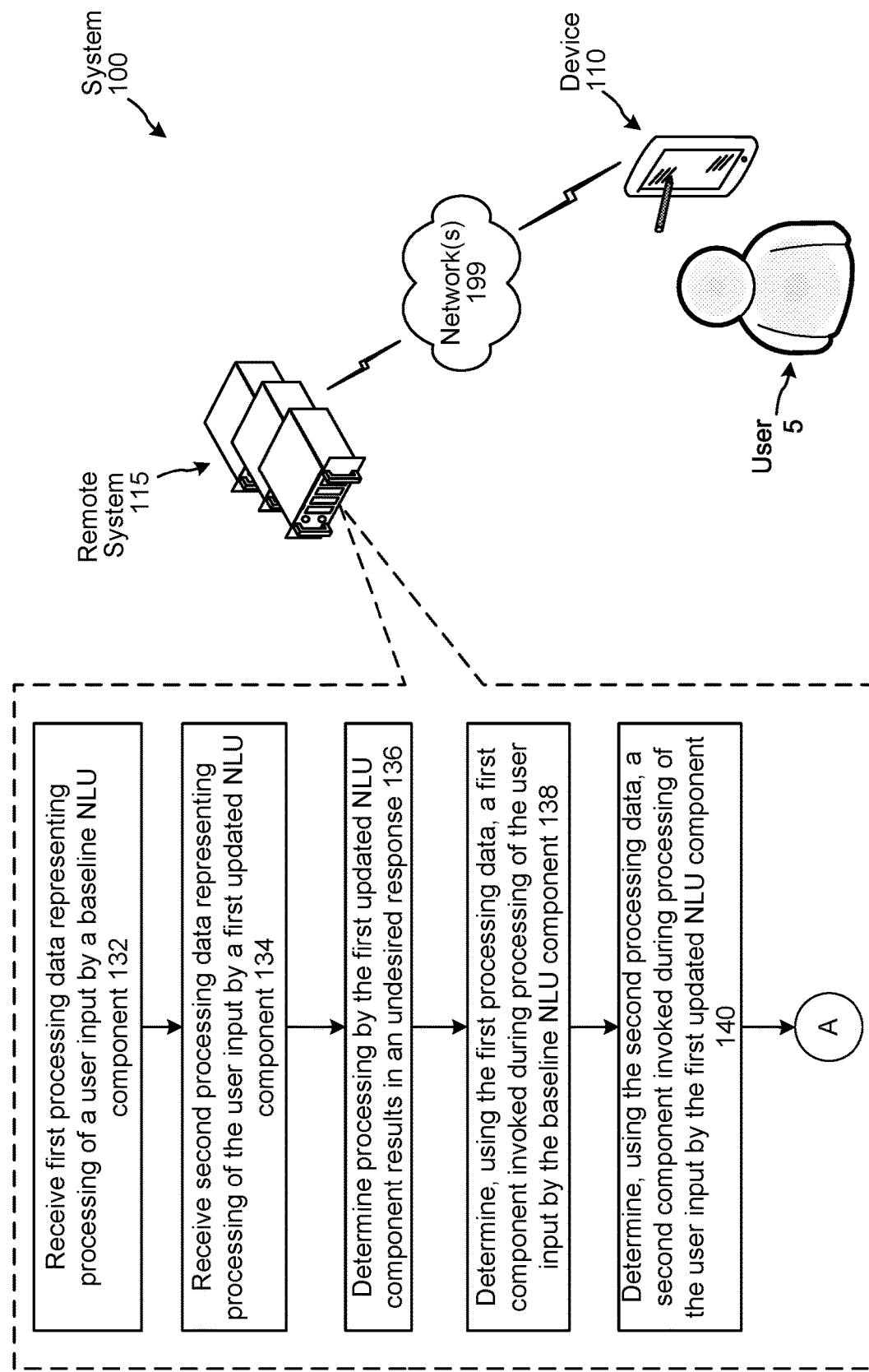

Machine learning (ML) models can be used for processing various types of data and performing various types of tasks. For example, machine learning models may be used to perform automatic speech recognition (ASR) processing, natural language understanding (NLU) processing, user recognition processing using speech, text-to-speech (TTS) processing, application/component routing, etc. ML models are often trained/configured using training data to perform a particular task.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a remote system. Text-to-speech (TTS) is a field of computer science concerning transforming textual and/or other data into audio data that is synthesized to resemble human speech. Collectively these may be referred to as a natural language processing (NLP) system.

Various components of a NLP system may be updated periodically based on user inputs received by the NLP system over a period of time, and/or to configure the NLP system to successfully process new user inputs. As part of this process, one or more components of the NLP system may be trained and evaluated. During evaluation, the updated NLP system may result in processing failures, such as generating an undesired response to one or more particular user inputs.

The present disclosure describes techniques for evaluating a baseline component and an updated component, and determining an action to resolve a processing failure of the updated component. After performing the action, the system may reevaluate the updated component to determine if further actions are needed or if the updated component is ready for runtime implementation. In some embodiments, the system of the present disclosure is configured to evaluate components of the NLU component. The system of the present disclosure, in some embodiments, receives processing data indicating which component of a baseline NLU component is invoked during processing of a user input, and which component of an updated NLU component is invoked during processing of the user input. Based on this information, the system may select an action to resolve a processing failure caused by the updated NLU component's processing of the user input. In selecting the action, the system may also consider how frequently the user input is received by the NLP system, and whether another action was unable to resolve the processing failure.

The systems and methods of the present disclosure improve a user experience, in particular for component developers or other similar users. For example, the systems and methods of the present disclosure may decrease the amount of time required to evaluate updated components for a NLP system and to determine resolutions to processing failures.

FIGS. 1A and 1B illustrate a system 100 configured to determine an action to resolve issues with updated NLU models. However, it will be appreciated that the system 100 may be configured to determine an action to resolve issues with non-NLU updated models. Although the figures and discussion of the present disclosure illustrate certain steps in a particular order, the steps described may be performed in a different order (as well as certain steps removed or added) without departing from the present disclosure. As shown in FIGS. 1A and 1B, the system 100 may include a device 110

(local to a user 5) in communication with a remote system 115 across one or more networks 199.

The device 110 may be a computing device (e.g., a laptop, a desktop, a tablet, smart phone, etc.) that may be used by the user 5 to initiate evaluation of a NLU model(s). The remote system 115 may be configured for offline operations of training and evaluating models for a NLP system (such as the NLP system 120 of FIG. 2). In some embodiments, the same system(s) may perform the offline operations (of training and configuring ML models) and the online/runtime operations (of processing incoming user inputs).

Generally, a NLU component may include one or more deterministic components (such as, finite state transducers (FSTs), one or more negative FSTs, one or more matching rules (MRs)), one or more statistical models, and/or one or more other ML models. The deterministic components may also be referred to as non-statistical models.

The remote system 115 receives (132) first processing data representing processing of a user input by a baseline NLU component. The first processing data may be generated when a NLU component 260 processes data corresponding to a natural language user input received by the NLP system 120. The NLU component 260 may be considered the baseline NLU component as the NLU component may already be used in online operations (i.e. during runtime/in production). In other embodiments, the baseline NLU component may not be currently used for online operations, and may represent a different baseline configuration that the user 5 wants to evaluate an updated NLU component against. Thus, as used herein, a "baseline" component, model, etc. is a component, model, etc. with respect to which performance of an updated corresponding component, model, etc. may be measured against. The first processing data may indicate which components/portions of the baseline NLU component are invoked when processing the user input. For example, the first processing data may indicate that a first type of deterministic component (e.g., FST) is invoked, a first statistical model is invoked or a second type of deterministic component (e.g., MR) is invoked when processing the user input. The first processing data may also include first NLU output data determined by the baseline NLU component as corresponding to the user input. The first NLU output data may be a NLU hypothesis(es) including an intent, one or more slot values (with each slot value corresponding to a different portion of the user input), one or more slot types, and a confidence score. The first NLU output data may also indicate a domain corresponding to the user input. In some embodiments, the confidence score of the NLU output data may be a binned representation of the confidence score. The confidence score may be binned into 3 values to correspond to one of low, medium or high values based on various threshold ranges. For example, a confidence score between 0-0.33 may be represented as a low confidence value, a confidence score between 0.34-0.67 may be represented as a medium confidence value, and a confidence score between 0.68-1.0 may be represented as a high confidence value. In other embodiments, the confidence score may be binned into 5 values to correspond to one of low, high-low, medium, low-high and high values. The ranges of the bins may be of similar length or may be of varying length.

The remote system 115 receives (134) second processing data representing processing of the user input by a first updated NLU component. The first updated NLU component may include similar components as the baseline NLU component, but one or more components may have been modified to enable processing of additional user inputs. For example, the first updated NLU component may include one or more FSTs that is different than a FST(s) included in the baseline NLU component. As another example, the first updated NLU component may include one or more MRs that is different than an MR(s) included in the baseline NLU component. In yet another example, the first updated NLU component may include one or more statistical models that is different than a statistical model(s) included in the baseline NLU component. The first updated NLU component may represent modifications made by the user 5 compared to the baseline NLU component. The second processing data may indicate which components/portions of the updated NLU component are invoked when processing the user input. For example, the second processing data may indicate that a second FST is invoked, a second statistical model is invoked or a second MR is invoked when processing the user input. The second processing data may also include second NLU output data determined by the updated NLU component as corresponding to the user input. The second NLU output data may be a NLU hypothesis(es) including an intent, one or more slot values, one or more slot types, and a confidence score. The second NLU output data may also indicate a domain corresponding to the user input. In some embodiments, the confidence score of the second NLU output data may be represented as a binned value (e.g., one of low, medium or high; one of low, high-low, medium, low-high, or high; etc.).

The remote system 115 determines (136) that processing of the user input by the first updated NLU component results in an undesired response. An undesired response may be a response by the NLP system 120 that was not expected or desired by a user that provided the user input. An undesired response may be caused when the NLP system 120 inaccurately interprets what the user said (e.g., determines an inaccurate intent and/or slot values associated with the user input, determines an inaccurate domain corresponding to the user input, etc.). An undesired response may also be caused when the NLP system 120 is unable to interpret what the user said with a certain level of confidence. In some cases, the NLP system 120 may encounter an error in processing the user input. For example, the undesired response may be an output by the NLP system 120, such as, "I am sorry, I did not understand what you said" or "I am sorry, I cannot process that." In another example, for the user input "play <XYZ>", the NLP system 120 may erroneously respond by starting a movie titled "XYZ" instead of playing a song titled "XYZ." In some embodiments, the undesired response to the user input may be caused by one or more modifications made to the baseline NLU component, which may cause the first updated NLU component to inaccurately interpret the user input.

The remote system 115 determines (138), using first processing data, a first component invoked during processing of the user input by the baseline NLU component. The first component may represent a portion of the baseline NLU component that is invoked to process the user input. Example portions/components of the baseline NLU component include one or more FSTs, one or more negative FSTs, one or more MRs, and/or one or more statistical models. For example, the remote system 115 may determine that a first FST of the baseline NLU component was invoked to process the user input.

The remote system 115 determines (140), using second processing data, a second component invoked during processing of the user input by the first updated NLU component. The second component may represent a portion of the first updated NLU component that is invoked to process the user input. Example portions/components of the first updated NLU component include one or more FSTs, one or more MRs, and/or one or more statistical models. For example, the remote system 115 may determine that a second FST of the first updated NLU component was invoked to process the user input.

Referring to FIG. 1B, the remote system 115 processes (142) the first component with respect to the second component. The remote system 115 may compare the first component (invoked during processing of the user input by the baseline NLU component) with the second component (invoked during processing of the user input by the first updated NLU component) to determine whether they are the same component or not. For example, the remote system 115 may determine that the first component is a statistical model and the second component is a FST. In another example, the remote system 115 may determine that the first component and the second component are the same FST. In another example, the remote system 115 may determine that the first component is a first MR and the second component is a different (second) MR. Thus, the remote system 115 determines whether the user input is being processed by the same portion/component of the first updated NLU component as the baseline NLU component. Based on which component is invoked by the respective NLU components, the remote system 115 may select an action to resolve the issue that is causing the undesired response, as described below with relation to step 148.

The remote system 115, using past user inputs, determines (144) a receipt frequency corresponding to the user input. The remote system 115 may access a database storing past user inputs received by the NLP system 120. In some embodiments, the database may also store a number of times the user input was received by the NLP system 120. In other embodiments, the database may store a number of times the user input as received by the NLP system 120 on a weekly basis. Some user inputs may be received by the NLP system 120 more times than other user inputs. For example, the NLP system 120 may receive the user input "What is today's weather?" from different users multiple times over a period of time (e.g., 1000 times during a week), while the NLP system 120 may receive the user input "Who is <XYZ>?" less frequently over the period of time (e.g., 10 times during a week). The remote system 115 may determine, in the database, a past user input corresponding to the user input, and determine the receipt frequency based on the frequency/number of times associated with the past user input. In some embodiments, the remote system 115 may determine if the user input is semantically similar to the past user input in determining whether the past user input corresponds to the user input. The remote system 115 may consider the receipt frequency in determining an action to resolve the issue of the first updated NLU component generating the undesired response to the user input.

The remote system 115 selects (148) an action with respect to determining a second updated NLU component that is configured to generate a desired response to the user input, and selects the action based on the receipt frequency of the user input and based on the processing of the first component with respect to the second component (per step 142). The remote system 115 may determine that performing a particular action will resolve the issue causing the undesired response (of the first updated NLU component), and in performing the action, the remote system 115 may generate a second updated NLU component that includes similar components as the first updated NLU component, but including at least one modified or additional component from that included in the first updated NLU component. The remote system 115 selects (148) the action based on the receipt frequency of the user input and based on the processing of the first component with respect to the second component (per step 142). The remote system 115 may determine whether the receipt frequency satisfies a threshold receipt frequency (e.g., at least 1000 times a week). Based on the comparison of the first component and the second component, the remote system 115 may determine a different action to perform. For example, if the baseline NLU component invoked a first FST and the first updated NLU component invoked the first FST and a second FST, the remote system 115 may determine that a conflict exists with respect to the first and second FSTs of the first updated NLU component. In response, the remote system 115 may update the first FST or the second FST to resolve the issue. In another example, if the baseline NLU component invoked a first statistical model and determined a first intent with a first confidence score corresponding to the user input, while the first updated NLU component invoked a second statistical model and determined the first intent with a second confidence score corresponding to the user input, then the remote system 115 may determine to retrain second statistical model of the first updated NLU component using different training data from that originally used to train the second statistical model.

The remote system 115 performs the selected action, which as described above, may be different in different cases. In some cases, the remote system 115 determines the second updated NLU component by updating (150) a first type of deterministic component (e.g., a FST) of the first updated NLU component or generating (150) a first type of deterministic component (e.g., a FST) to add to the first updated NLU component (resulting in the second updated NLU component). In other cases, the remote system 115 determines the second updated NLU component by updating (152) a second type of deterministic component (e.g., an MR) of the first updated NLU component or generating (152) a second type of deterministic component (e.g., an MR) to add to the first updated NLU component (resulting in the second updated NLU component). In other cases, the remote system 115 determines the second updated NLU component by updating (154) one or more statistical models of the first updated NLU component (resulting in the second updated NLU component). Further details on which action the remote system 115 may perform given particular circumstances are described in relation to FIGS. 7A-7E.

In some embodiments, the remote system 115 may evaluate the second updated NLU component to determine that it successfully processes the user input, and then store the second updated NLU component for use during online operations to process future user inputs received by the NLP system 120 at runtime. A user input may be a natural language user input, which may be a spoken input, a text input, received sensor data corresponding to stored natural language text, image data corresponding to stored natural language text, image data representing a user-performed gesture(s) corresponding to stored natural language text, and other forms of inputs.

In some embodiments, one of the actions performed by the remote system 115 may be to initiate automated hyperparameter tuning to resolve issues with the updated NLU component. The remote system 115 may determine, based on changes/differences between the baseline NLU component and the updated NLU component that the parameters for one or more models may have been changed, and that tuning these parameters may cause the updated NLU component to generate a desired response to the user input. To initiate automated hyper-parameter tuning, the remote system 115 may make an API call and provide as inputs a model for which parameters are to be tuned, a list of parameters to tune, possible values for the parameters to test, a metric to be improved, a stopping criteria indicating when to stop testing additional values, and other data. During automated hyper-parameter tuning, different values for different parameter configurations may be evaluated, and based on a metric, a particular value may be selected to determine the models to be used for runtime processing. The parameters that may be tuned may include learning rate, batch size, number of layers, number of hidden layers, kernel, number of epochs, etc.

A system according to the present disclosure may be configured to incorporate user permissions and may only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

Figure 2:
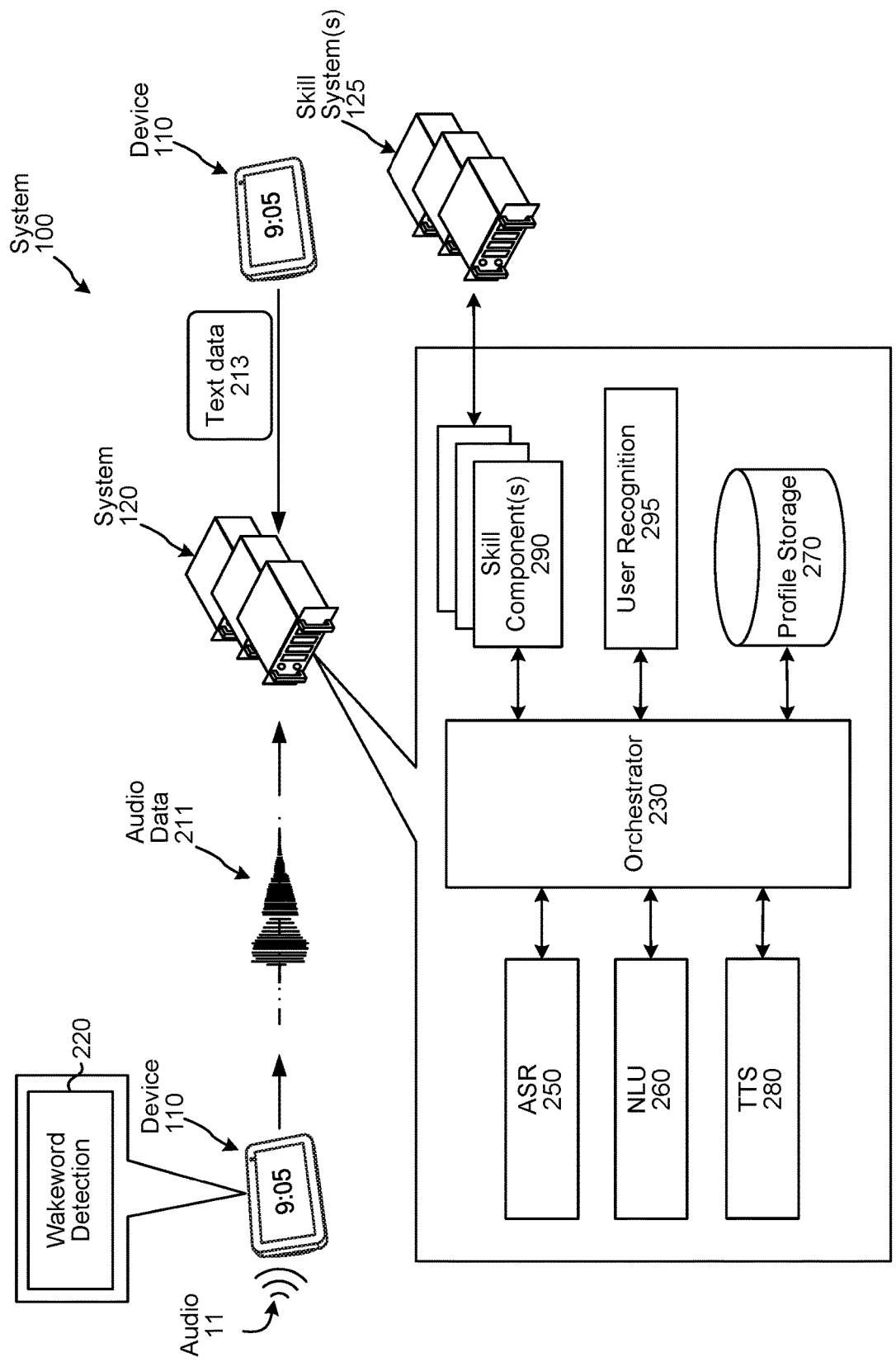
FIG. 2 is a conceptual diagram of components of a system, according to embodiments of the present disclosure.

The system 100 may operate using various components as illustrated in FIG. 2. The various components may be located on a same or different physical devices. Communication between various components may occur directly or across a network(s) 199.

A microphone or array of microphones (of or otherwise associated with the device 110) may capture audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the device 110 may implement a classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when the user 5 intends to speak an input to the system 120. The device 110 may be configured to detect various wakewords. In at least some examples, each wakeword may correspond to a different digital assistant. In at least some examples, a wakeword may correspond to a name of a digital assistant. An example wakeword/digital assistant name is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 220 detects a wakeword, the device 110 may "wake" and begin transmitting audio data 211, representing the audio 11, to the system 120. The audio data 211 may include data corresponding to the detected wakeword, or the device 110 may remove the portion of the audio corresponding to the detected wakeword prior to sending the audio data 211 to the system 120.

The system 120 may include an orchestrator component 230 configured to receive the audio data 211 from the device 110. The orchestrator component 230 may send the audio data 211 to an ASR component 250.

The ASR component 250 transcribes the audio data 211 into ASR output data including one or more ASR hypotheses. ASR output data may include one or more textual interpretations (corresponding to one or more ASR hypotheses), or may be configured in another manner, such as one or more tokens. Each ASR hypothesis may represent a different likely interpretation of the speech in the audio data 211. Each ASR hypothesis may be associated with a score representing a confidence of ASR processing performed to generate the ASR hypothesis with which the score is associated.

The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211.

Alternatively, the device 110 may receive a text-based (e.g., typed) natural language input. The device 110 may generate text data 213 representing the typed natural language input, and may send the text data 213 to the system 120, wherein the text data 213 is received by the orchestrator component 230.

Figure 3:
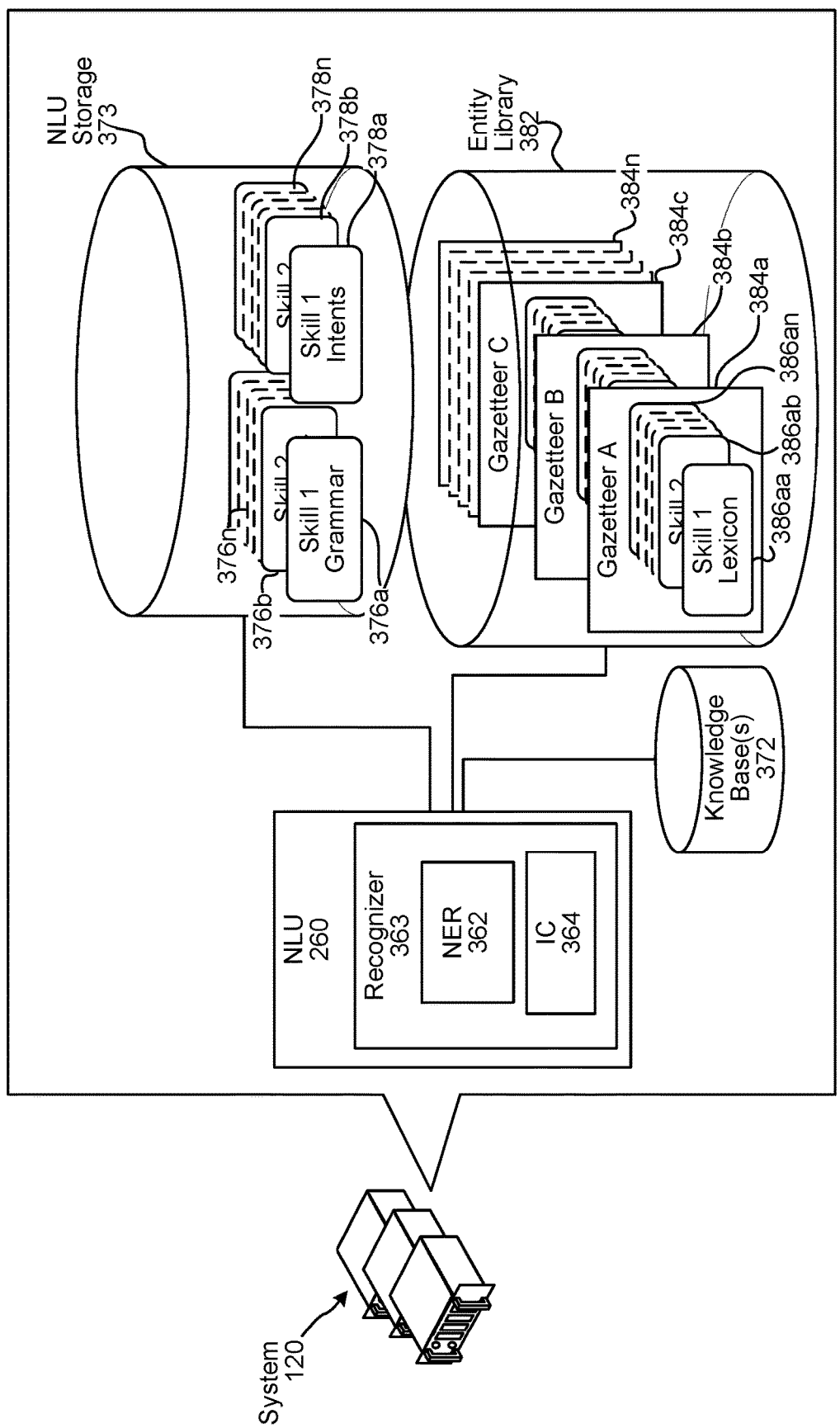
FIG. 3 is a conceptual diagram of how natural language understanding (NLU) processing may be performed, according to embodiments of the present disclosure.
Figure 4:
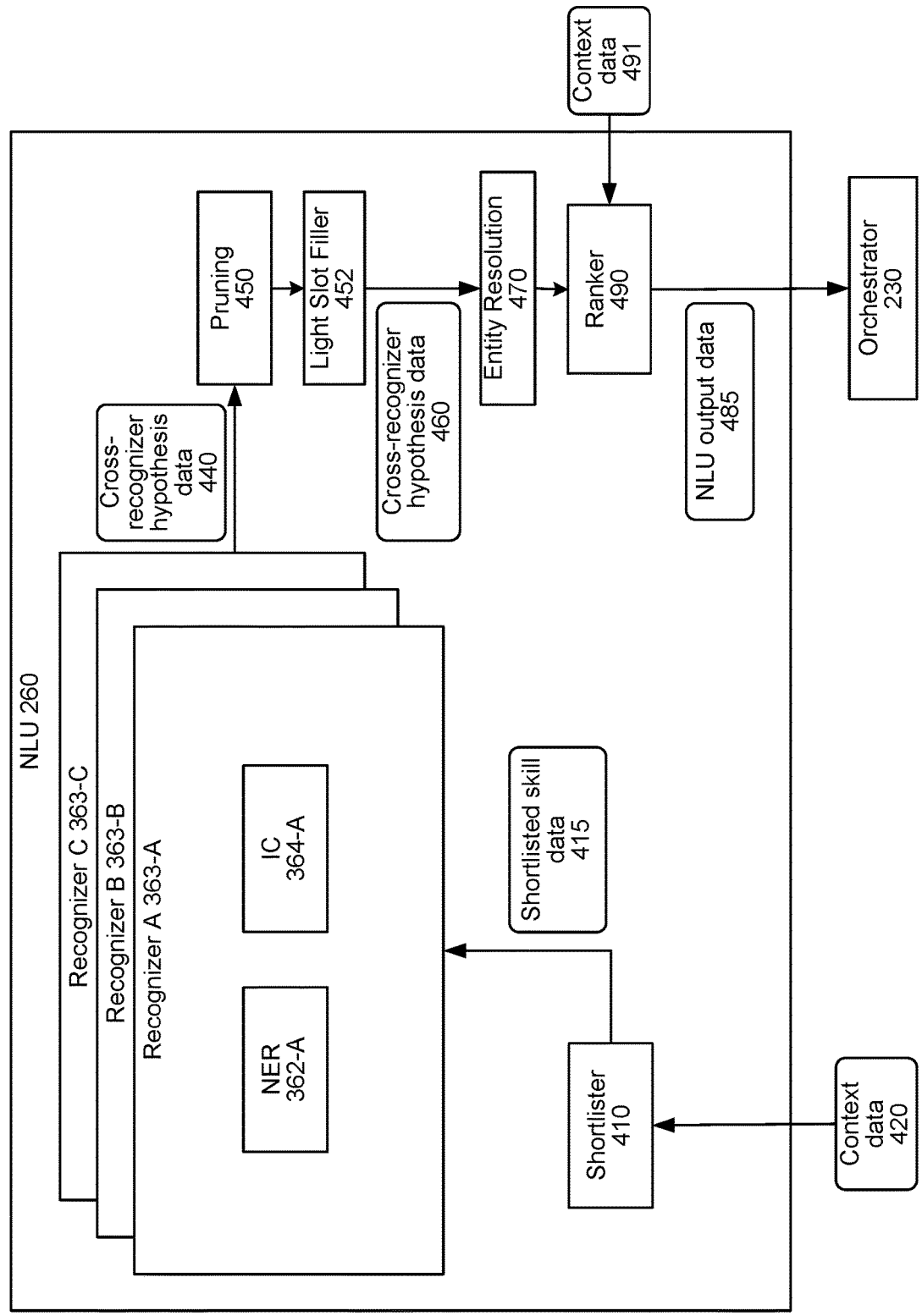
FIG. 4 is a conceptual diagram of how NLU processing may be performed, according to embodiments of the present disclosure.

The orchestrator component 230 may send the text data 213 or ASR output data output, depending on the type of natural language input received, to a NLU component 260. FIGS. 3-4 illustrate how the NLU component 260 may perform NLU processing. For reference, as used below, a "skill" may refer to a skill component 290, a skill system 125, or a combination of a skill component 290 and an associated skill system 125.

The NLU component 260 may include one or more recognizers 363. In at least some embodiments, a recognizer 363 may be associated with a skill (e.g., the recognizer may be configured to interpret a natural language input to correspond to the skill). In at least some other embodiments, a recognizer 363 may be associated with a domain (e.g., the recognizer may be configured to interpret a natural language input to correspond to the domain). A non-limiting list of domains includes a smart home domain, a music domain, a video domain, a flash briefing domain, a shopping domain, a communications domain, and a custom domain.

Recognizers 363 may process in parallel, in series, partially in parallel, etc. For example, a recognizer corresponding to a first skill may process at least partially in parallel to a recognizer corresponding to a second skill. For further example, a recognizer corresponding to a first domain may process at least partially in parallel to a recognizer corresponding to a second domain. In another example, a recognizer corresponding to a skill may process at least partially in parallel to a recognizer corresponding to a domain.

The NLU component 260 may communicate with an NLU storage 373 including skill grammars (376a-376n), representing how natural language inputs may be formulated to invoke skills, and skill intents (378a-378n) representing intents supported by respective skills. While not illustrated, the NLU storage 373 may also or alternatively include domain grammars, representing how natural language inputs may be formulated to invoke domains, and domain intents representing intents supported by respective domains.

Each recognizer 363 may be associated with a particular grammar 376, one or more particular intents 378, and a particular personalized lexicon 386 (stored in an entity library 382). A gazetteer 384 may include skill-indexed (or domain-indexed) lexical information associated with a particular user. For example, Gazetteer A (384a) may include skill-indexed (or domain-indexed) lexical information 386aa to 386an. A user's music skill (or music domain) lexical information might include album titles, artist names, and song names, for example, whereas a user's contact list skill (or contact list domain) lexical information might include the names of contacts. Since every user's music collection and contact list is presumably different, this personalized information may improve entity resolution.

Each recognizer 363 may include a named entity recognition (NER) component 362 that attempts to identify grammars and lexical information that may be used to construe meaning with respect to text data/ASR output data input therein. An NER component 362 identifies portions of text data/ASR output data that correspond to a named entity that may be recognizable by the system 120. An NER component 362 may also determine whether a word refers to an entity that is not explicitly mentioned in the text data/ASR output data, for example "him," "her," "it" or other anaphora, or the like.

An NER component 362 applies grammar models 376 and lexical information 386 associated with one or more skills (or one or more domains) to determine a mention of one or more entities in text data/ASR output data input therein. In this manner, an NER component 362 identifies "slots" (i.e., particular words in text data/ASR output data) that may be needed for later processing. An NER component 362 may also label each slot with a type (e.g., noun, place, city, artist name, song name, etc.).

Each grammar model 376 may include the names of entities (i.e., nouns) commonly found in natural language corresponding to a particular skill (or domain) to which the grammar model 376 relates, whereas lexical information 386 may be personalized to the user identifier output by a user recognition component 295 for the natural language input. For example, a grammar model 376 associated with a shopping skill (or domain) may include a database of words commonly used when people discuss shopping.

Each recognizer 363 may also include an intent classification (IC) component 364 that processes text data/ASR output data to determine an intent(s) of a skill(s) (or domain (s)) that potentially corresponds to the natural language input represented in the text data/ASR output data. An intent corresponds to an action to be performed that is responsive to the natural language input. An IC component 364 may communicate with a database 378 of words linked to intents. For example, a music intent database may link words and phrases such as "quiet," "volume off," and "mute" to a <Mute> intent. An IC component 364 identifies potential intents by comparing words and phrases in text data/ASR output data to the words and phrases in an intents database 378 associated with the skill(s) (or dimain(s)) that is associated with the recognizer 363 implementing the IC component 364.

The intents identifiable by a specific IC component 364 may be linked to one or more skill-specific (or domain-specific) grammar frameworks 376 with "slots" to be filled. Each slot of a grammar framework 376 corresponds to a portion of text data/ASR output data that an NER component 362 believes corresponds to an entity. For example, a grammar framework 376 corresponding to a <PlayMusic> intent may correspond to sentence structures such as "Play {Artist Name}," "Play {Album Name}," "Play {Song name}," "Play {Song name} by {Artist Name}," etc. However, to make resolution more flexible, grammar frameworks 376 may not be structured as sentences, but rather based on associating slots with grammatical tags.

For example, an NER component 362 may identify words in text data/ASR output data as subject, object, verb, preposition, etc. based on grammar rules and/or models prior to recognizing named entities in the text data/ASR output data. An IC component 364 (implemented by the same recognizer 363 as the NER component 362) may use the identified verb to identify an intent. The NER component 362 may then determine a grammar model 376 associated with the identified intent. For example, a grammar model 376 for a <PlayMusic> intent may specify a list of slots applicable to play the identified "object" and any object modifier (e.g., a prepositional phrase), such as {Artist Name}, {Album Name}, {Song name}, etc. The NER component 362 may then search corresponding fields in a lexicon 386, attempting to match words and phrases in the text data/ASR output data the NER component 362 previously tagged as a grammatical object or object modifier with those identified in the lexicon 386.

An NER component 362 may perform semantic tagging, which is the labeling of a word or combination of words according to their type/semantic meaning. An NER component 362 may parse text data/ASR output data using heuristic grammar rules, or a model may be constructed using techniques such as hidden Markov models, maximum entropy models, log linear models, conditional random fields (CRF), and the like. For example, an NER component 362, implemented by a music skill or music domain recognizer 363, may parse and tag text data/ASR output data corresponding to "play mother's little helper by the rolling stones" as {Verb}: "Play," {Object}: "mother's little helper," {Object Preposition}: "by," and {Object Modifier}: "the rolling stones." The NER component 362 may identify "Play" as a verb based on a word database associated with the music skill or music domain, which an IC component 364 may determine corresponds to a <PlayMusic> intent. At this stage, no determination has been made as to the meaning of "mother's little helper" and "the rolling stones," but based on grammar rules and models, the NER component 362 has determined that these phrases relates to the grammatical object (i.e., entity).

The frameworks linked to the intent are then used to determine what database fields should be searched to determine the meaning of these phrases, such as searching a user's gazetteer 384 for similarity with the framework slots. For example, a framework for a <PlayMusic> intent might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 384 does not resolve a slot/field using gazetteer information, the NER component 362 may search a database of generic words (in the knowledge base 372). For example, if the text data/ASR output data corresponds to "play songs by the rolling stones," after failing to determine an album name or song name called "songs" by "the rolling stones," the NER component 362 may search a music skill (or music domain) vocabulary for the word "songs." In the alternative, generic words may be checked before the gazetteer information, or both may be tried, potentially producing two different results.

A recognizer 363 may tag text data/ASR output data to attribute meaning thereto. For example, a recognizer 363 may tag "play mother's little helper by the rolling stones" as: {skill} Music, {intent} Play Music, {artist name} rolling stones, {media type} SONG, and {song title} mother's little helper. For further example, a recognizer 363 may tag "play songs by the rolling stones" as: {domain} Music, {intent} Play Music, {artist name} rolling stones, and {media type} SONG.

As described above, more than one recognizer 363 may process with respect to text data/ASR output data representing a single natural language input. In such instances, each recognizer 363 may output at least one NLU hypothesis including an intent indicator (determined by an IC component 364 of the recognizer 363) and at least one tagged named entity (determined by an NER component 362 of the recognizer 363).

The NLU component 260 may include a shortlister component 410 (as illustrated in FIG. 4). The shortlister component 410 selects skills that may execute in response to the natural language input. The shortlister component 410 thus limits downstream, more resource intensive NLU processes to being performed with respect to skills that are likely to execute in response to the natural language input.

Without a shortlister component 410, the NLU component 260 may process text data/ASR output data with respect to every skill of (or in communication with) the system 120, either in parallel, in series, or using some combination thereof. By implementing a shortlister component 410, the NLU component 260 may process text data/ASR output data with respect to only skills that are likely to execute in response to the natural language input. This reduces total compute power and latency attributed to NLU processing.

The shortlister component 410 may include one or more trained models. The model(s) may be trained to recognize various forms of natural language inputs that may be received by the system 120. For example, during a training period, a skill may provide the system 120 with training data representing sample natural language inputs that may be used to invoke the skill. For example, a ride sharing skill may provide the system 120 with training data corresponding to "get me a cab to [location]," "get me a ride to [location]," "book me a cab to [location]," "book me a ride to [location]," etc. The one or more trained models, to be used by the shortlister component 410, may be trained using the training data to determine other potentially related natural language input structures that a user may try to use to invoke the skill. During training, the system 120 may query the skill regarding whether the determined other natural language input structures are permissible to be used to invoke the skill at runtime. The alternate natural language input structures may be derived by one or more trained models during model training and/or may be based on natural language input structures provided by different skills. The skill may also provide the system 120 with training data indicating grammar and annotations.

The system 120 may use the training data representing the sample natural language inputs, the determined related natural language input(s), the grammar, and the annotations to train a model that indicates when a runtime natural language input is likely to be handled by a skill. Each trained model of the shortlister component 410 may be trained with respect to a different skill. Alternatively, the shortlister component 410 may use one trained model per skill type, such as one trained model for weather skills, one trained model for ride sharing skills, etc.

The system 120 may use the sample natural language inputs provided by a skill, and related sample natural language inputs determined during training, as binary examples to train a model associated with the skill. For example, some sample natural language inputs may be positive training examples (e.g., natural language inputs that may be used to invoke the skill), while other sample natural language inputs may be negative training examples (e.g., natural language inputs that may not be used to invoke the skill).

As described above, the shortlister component 410 may include a different trained model for each skill or a different trained model for each skill type. Alternatively, the shortlister component 410 may include a single model that includes a portion trained with respect to characteristics (e.g., semantic characteristics) shared by all skills. The single model may also include skill-specific portions, with each skill-specific portion being trained with respect to a different skill. Implementing a single model with skill-specific portions may result in less latency than implementing a different trained model for each skill because the single model with skill-specific portions limits the number of characteristics processed on a per skill level.

The portion of the model, trained with respect to characteristics shared by more than one skill, may be clustered based on skill type. For example, a first portion may be trained with respect to weather skills, a second portion may be trained with respect to music skills, a third portion may be trained with respect to travel skills, etc.

Clustering may not be beneficial in every instance because clustering may cause the shortlister component 410 to output indications of only a portion of the skills that the natural language input may relate to. For example, a natural language input may correspond to "tell me about Tom Collins." If the model is clustered based on skill type, the shortlister component 410 may determine the natural language input corresponds to a recipe skill (e.g., a drink recipe) even though the natural language input may also correspond to an information skill (e.g., storing or otherwise having access to information about a person named Tom Collins).

Training the shortlister component 410 (and other machine learned components described herein) may require establishing a "ground truth" for the training examples input therein. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

A machine learned component may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

If the shortlister component 410 determines a natural language input is associated with multiple skills, only the recognizers 363 associated with those skills may be called to process with respect to the natural language input. The selected recognizers 363 may process in parallel, in series, partially in parallel, etc. For example, if the shortlister component 410 determines a natural language input relates to both a communications skill and a music skill, a recognizer 363 associated with the communications skill may process in parallel, or partially in parallel, with a recognizer 363 associated with the music skill.

The shortlister component 410 may make binary (e.g., yes/no, I/O, etc.) determinations regarding whether a skill corresponds to a natural language input. The shortlister component 410 may make such determinations using the one or more trained models described herein above. If the shortlister component 410 implements a single trained model for each skill, the shortlister component 410 may simply run the models that are associated with enabled skills as indicated in a profile (e.g., stored in a profile storage 270 described in further detail below) associated with the device 110 and/or user 5.

The shortlister component 410 may generate shortlisted skill data 415 (illustrated in FIG. 4) representing one or more skills that relate to the natural language input. The number of skills represented in the shortlisted skill data 415 is configurable. In an example, the shortlisted skill data 415 may indicate every skill of (or otherwise in communication with) the system 120 as well as represent, for each skill, whether the skill relates to the natural language input. In another example, instead of indicating every skill, the shortlisted skill data 415 may only indicate the skills that the shortlister component 410 determines relates to the natural language input. In yet another example, the shortlister component 410 may implement thresholding such that the shortlisted skill data 415 may indicate no more than a maximum number of skills that the shortlister component 410 determines relates to the natural language input.

In at least some embodiments, the shortlister component 410 may generate a score representing how likely a skill relates to a natural language input. In such embodiments, the shortlisted skill data 415 may only include identifiers of skills associated with scores satisfying a condition (e.g., meeting or exceeding a threshold score).

In the situation where the ASR component 250 outputs ASR output data including more than one ASR hypothesis, the shortlister component 410 may output different shortlisted skill data 415 for each ASR hypothesis. Alternatively, the shortlister component 410 may output a single instance of shortlisted skill data 415 that represents skills corresponding to the different ASR hypotheses.

As indicated above, the shortlister component 410 may implement thresholding such that the shortlisted skill data 415 may indicate no more than a threshold number of skills (e.g., may include no more than a threshold number of skill identifiers). If the ASR component 250 outputs ASR output data including more than one ASR hypothesis, the shortlisted skill data 415 may indicate no more than a threshold number of skills irrespective of the number of ASR hypotheses. Additionally or alternatively, the shortlisted skill data 415 may indicate no more than a threshold number of skills for each ASR hypothesis (e.g., indicating no more than five skills for a first ASR hypothesis, no more than five skills for a second ASR hypothesis, etc.).

If the shortlister component 410 implements a different trained model for each skill, the shortlister component 410 may generate a different confidence score for each skill-specific trained model that is run by the shortlister component 410. For example, if the shortlister component 410 runs the models of every skill of (or otherwise in communication with) the system 120, the shortlister component 410 may generate a respective confidence score for each skill of (or otherwise in communication with) the system 120. For further example, if the shortlister component 410 only runs models specific to skills that are indicated as enabled in a profile associated with the device 110 and/or user 5 (as stored in the profile storage 270), the shortlister component 410 may only generate a respective confidence score for each enabled skill. For further example, if the shortlister component 410 implements a single trained model with skill-specific portions, the shortlister component 410 generate a respective confidence score for each skill who's specifically trained portion is run. The shortlister component 410 may perform matrix vector modification to obtain confidence scores for skills.

An example of shortlisted skill data 415 including confidence scores may be represented as:

Search skill, 0.67
Recipe skill, 0.62

Information skill, 0.57

As indicated, the confidence scores output by the shortlister component 410 may be numeric values. The confidence scores output by the shortlister component 410 may alternatively be binned values (e.g., high, medium, low).

The shortlister component 410 may consider context data 420 when determining which skills relate to a natural language input. The context data 420 may be embedded (e.g., character embedded using art known or proprietary techniques) prior to being input to the shortlister component 410.

The context data 420 may include usage history data associated with the device 110 and/or user 5. For example, a confidence score of a skill may be increased if natural language inputs captured by the device 110 and/or originating from the user 5 routinely relate to the skill. Conversely, a confidence score of a skill may be decreased if natural language inputs captured by the device 110 and/or originated from the user 5 rarely relate to the skill.

The context data 420 may indicate the skills that are enabled with respect to the device 110 and/or user 5 (e.g., as represented in the profile storage 270). The shortlister component 410 may use such context data 420 to determine which skill-specific trained models to run. That is, the shortlister component 410 may determine to only run the trained models associated with enabled skills. The shortlister component 410 may alternatively use such context data 420 to alter skill confidence scores represented in the shortlisted skill data 415. As an example, considering two skills, one enabled and another unenabled, the shortlister component 410 may run a first model (or model portion) specific to the unenabled skill as well as a second model (or model portion) specific to the enabled skill. The shortlister component 410 may initially determine a confidence score of 0.60 for each of the skills. The shortlister component 410 may then alter those confidence scores based on which skill is enabled. For example, the shortlister component 410 may increase the confidence score associated with the enabled skill and/or decrease the confidence score associated with the unenabled skill.

The context data 420 may indicate a type of the device 110. The type of the device 110 may represent the input/output capabilities of the device 110. For example, a device type may represent the device 110 includes a display, the device 110 is headless (e.g., displayless), the device 110 is a mobile device, the device 110 is a stationary device, the device 110 includes audio playback capabilities, the device 110 includes a camera, etc. The shortlister component 410 may use such context data 420 to determine which skill-specific trained models (or portions of a model) to run. For example, if the device 110 corresponds to a displayless device type, the shortlister component 410 may determine not to run trained models (or portions of a model) specific to skills that output video data. The shortlister component 410 may alternatively use such context data 420 to alter skill confidence scores represented in the shortlisted skill data 415. As an example, considering two skills, one that outputs audio data and another that outputs video data, the shortlister component 410 may run a first model (or first portion of a model) specific to the skill that generates audio data as well as a second model (or second portion of a model) specific to the skill that generates video data. The shortlister component 410 may initially determine a confidence score of 0.60 for each of the skills. The shortlister component 410 may then alter the original confidence scores based on the type of the device 110. For example, if the device 110 corresponds to a displayless device type, the shortlister component 410 may increase the confidence score associated with the skill that generates audio data and/or decrease the confidence score associated with the skill that generates video data.

The device type, represented in the context data 420, may represent output capabilities of a device 110 to be used to output a response to the user 5, which may not necessarily be the device 110 that captured the natural language input (or other type of command). For example, a displayless device 110 may receive a natural language input corresponding to "play Game of Thrones," and the system 120 may determine a smart TV, or other device including or otherwise associated with a display, is to be used to output multimedia content (e.g., audio and video) corresponding to the title "Game of Thrones."

The context data 420 may indicate a speed of the device 110, a location of the device 110, or other mobility data. For example, the device 110 may correspond to a vehicle including a display. If the vehicle is moving, the shortlister component 410 may decrease the confidence score associated with a skill that generates video data as it may be undesirable to output video content to the user 5 while in a moving vehicle. The vehicle may be configured to periodically send, to the system 120, data indicating whether the vehicle is in motion.

The context data 420 may indicate a currently invoked skill (e.g., a skill that was being used to output content to the user 5 when the device 110 received the natural language input or other command). For example, the user 5 may speak a first natural language input causing the system 120 to invoke a music skill to output music to the user 5. As the music is being output, the system 120 may receive a second natural language input. The shortlister component 410 may use such context data 420 to alter skill confidence scores represented in the shortlisted skill data 415. For example, the shortlister component 410 may run a first model (or a first portion of model) specific to the music skill as well as a second model (or second portion of a model) specific to a second skill. The shortlister component 410 may initially determine a confidence score of 0.60 for each of the skills. The shortlister component 410 may then alter the original confidence scores based on the music skill being invoked to output content while the second natural language input was received. Based on the music skill being invoked, the shortlister component 410 may increase the confidence score associated with the music skill and/or decrease the confidence score associated with the second skill.

The thresholding implemented with respect to the shortlisted skill data 415, and the different types of context data 420 considered by the shortlister component 410, are configurable.

The shortlister component 410 may cause the NLU component 260 to execute only a subset of the recognizers 363 associated with skills represented in the shortlisted skill data 415 as relating to the natural language input. If the shortlister component 410 generates the shortlisted skill data 415 to include confidence scores, the shortlister component 410 may cause the NLU component 260 to execute only recognizers 363 associated with skills associated with confidence scores satisfying (e.g., meeting or exceeding) a condition (e.g., a threshold confidence score).

The NLU component 260 may aggregate NLU hypotheses, output by multiple recognizers 363, into cross-recognizer hypothesis data 440 (illustrated in FIG. 4). Each NLU hypothesis may be associated with a respective score indicating a likelihood that the NLU hypothesis corresponds to the domain, skill(s), etc. associated with the recognizer 363 from which the NLU hypothesis was output. For example, the cross-recognizer hypothesis data 440 may be represented as, with each line corresponding to a different NLU hypothesis:

[0.95] Intent: <PlayMusic> AlbumName: GameOfThrones

[0.70] Intent: <PlayVideo> VideoTitle: GameOfThrones. While the foregoing illustrates cross-recognizer hypothesis data 440 include two NLU hypotheses, it will be appreciated that the cross-recognizer hypothesis data 440 may include differing numbers of NLU hypotheses with departing from the present disclosure.

The NLU component 260 may send the cross-recognizer hypothesis data 440 to a pruning component 450, which sorts the NLU hypotheses according to their respective scores. The pruning component 450 may then perform score thresholding with respect to the cross-recognizer hypothesis data 440. For example, the pruning component 450 may select NLU hypotheses associated with scores satisfying (e.g., meeting and/or exceeding) a condition (e.g., a threshold score). The pruning component 450 may additionally or alternatively perform number of NLU hypothesis thresholding. For example, the pruning component 450 may select a threshold number of top-scoring NLU hypotheses represented in the cross-recognizer hypothesis data 440.

The pruning component 450 may generate cross-recognizer hypothesis data 460 including the selected NLU hypotheses. The purpose of the pruning component 450 is to create a reduced list of NLU hypotheses so that downstream, more resource intensive, processes may only operate on NLU hypotheses that most likely represent the natural language input.

The NLU component 260 may include a light slot filler component 452 that takes text data, represented in the NLU hypotheses output by the pruning component 450, and alters it to make the text data more easily processed by downstream components. The light slot filler component 452 may perform low latency operations that do not involve heavy operations such as reference to a knowledge base. The purpose of the light slot filler component 452 is to replace words with other words or values that may be more easily understood by downstream components. For example, if a NLU hypothesis includes the word "tomorrow," the light slot filler component 452 may replace the word "tomorrow" with an actual date for purposes of downstream processing. Similarly, the light slot filler component 452 may replace the word "CD" with "album" or "compact disc." The replaced text data is then included in the cross-recognizer hypothesis data 460.

The cross-recognizer hypothesis data 460 may be sent to an entity resolution component 470. The entity resolution component 470 can apply rules or other instructions to standardize labels or tokens in the NLU hypotheses represented in the cross-recognizer hypothesis data 460. The precise transformation may depend on the skill, domain, etc. to which a NLU hypothesis relates. For example, for a travel skill-specific NLU hypothesis, the entity resolution component 470 may transform text data corresponding to "Boston airport" to the standard "BOS" three-letter code referring to the airport. The entity resolution component 470 can refer to a knowledge base that is used to specifically identify the precise entity referred to in each slot of each NLU hypothesis represented in the cross-recognizer hypothesis data 460.

Specific intent/slot combinations may also be tied to a particular source, which may then be used to resolve the text data. Referring to the example natural language input "play songs by the stones," the entity resolution component 470 may reference a personal music catalog, user profile, or the like. The entity resolution component 470 may output NLU hypotheses, altered from the cross-recognizer hypothesis data 460, that include more detailed information (e.g., entity identifiers) about the specific entities mentioned in the slots and/or more detailed slot data that can eventually be used by a skill to perform an action responsive to the natural language input. The NLU component 260 may include multiple entity resolution components that are each specific to one or more different skills, domains, etc.

The NLU component 260 may include a ranker component 490 that assigns a particular score to each NLU hypothesis output by the entity resolution component 470. The ranker component 490 may alter the score of a particular NLU hypothesis based on whether the NLU hypothesis has unfilled slots. For example, if a first NLU hypothesis includes slots that are all filled/resolved, the ranker component 490 may assign the first NLU hypothesis a higher score than a second NLU hypothesis including at least one slot that is unfilled/unresolved by the entity resolution component 470.

The ranker component 490 may apply re-scoring, biasing, or other techniques. To do so, the ranker component 490 may consider not only the data output by the entity resolution component 470, but may also context data 491.

The context data 491 may indicate skill ratings or popularities. For example, if a skill has a high rating, the ranker component 490 may increase the score of a NLU hypothesis associated with that skill, and vice versa.

The context data 491 may indicate skills that have been enabled by the user 5. For example, the ranker component 490 may assign higher scores to NLU hypotheses associated with enabled skills than to NLU hypotheses associated with skills that have not been enabled by the user 5.

The context data 491 may indicate a system usage history (e.g., specific to the user 5), such as if the user 5 regularly invokes a particular skill or does so at particular times of day. The context data 491 may indicate a present date, a present time, a location of the device 110, weather data, a type of the device 110, user preferences, as well as other context data. For example, the ranker component 490 may consider when any particular skill is currently active with respect to the present user 5 and/or device 110 (e.g., music being output by the skill when the current natural language input is received).

The ranker component 490 may output NLU output data 485 including one or more NLU hypotheses. The NLU component 260 may send the NLU output data 485 to the orchestrator component 230.

As described above, the system 120 may perform speech processing using two different components (e.g., the ASR component 250 and the NLU component 260). In at least some embodiments, the system 120 may implement a spoken language understanding (SLU) component configured to process audio data 211 to generate NLU output data 485.

The SLU component may be equivalent to a combination of the ASR component 250 and the NLU component 260. Yet, the SLU component may process audio data 211 and directly generate the NLU output data 485, without an intermediate step of generating ASR output data. As such, the SLU component may take audio data 211 representing speech and attempt to make a semantic interpretation of the speech. That is, the SLU component may determine a meaning associated with the speech and then implement that meaning. For example, the SLU component may interpret audio data 211 representing speech from the user 5 in order to derive a desired action. The SLU component may output a most likely NLU hypothesis, or multiple NLU hypotheses associated with respective confidence or other scores (such as probability scores, etc.).

A skill developer (via a skill developer device) may provide the system 120 with rules data, corresponding to one or more rules, representing when the skill developer's skill should be called to execute. In at least some embodiments, such a rule may be specific to an NLU intent. In such embodiments, if a skill system 125 is configured to execute with respect to multiple intents, the skill may be associated with more than one rule (e.g., each rule corresponding to a different intent capable of being handled by the skill). In addition to being specific to an intent, a rule may indicate one or more entities identifiable by an NER component 362, one or more entity identifiers capable of being output by the entity resolution component 470, and/or context to which a natural language input may correspond. For example, a rule may indicate output capabilities of a device, a geographic location, an operation mode of a device (e.g., that a device needs to be enabled to be used for 1-way messaging functionality of the system 120, that a device needs to be enabled to be used for 2-way communication functionality of the system 120, that a device needs to be enabled to output announcement content, etc.), and/or other context data. The system 120 may associate a skill's identifier with each rule corresponding to the skill. As an example, the system 120 may store rule data indicating a video skill may execute when a natural language input corresponds to a <PlayVideo> intent and the device (to be used to output a response to the natural language input) includes (or is otherwise associated with) a display. As another example, the system 120 may store rule data indicating a music skill may execute when a natural language input corresponds to a <PlayMusic> intent and music is being output by a device when the device captures a natural language input. It will be appreciated that other examples are possible. The foregoing rules enable skills to be selectively proposed at runtime (e.g., based on NLU entities, NLU entity resolution identifiers, and context data) in systems where multiple skills are configured to execute with respect to a same NLU intent.

A skill proposer component may output data including skill identifiers and associated NLU output data. For example, each skill identifier may be associated with one or more NLU hypotheses (represented in the NLU output data 485). The skill proposer may make binary determinations, as such, the skill proposer may not make any confidence determinations, and the skill identifiers may not be associated with confidence values. An illustrative example of the data that may be output by the skill proposer, may be represented as:

Skill Identifier: lds532 Intent: <PlayMusic> AlbumName: GameOfThrones
Skill Identifier: jfdlk828 Intent: <PlayVideo> VideoTitle: GameOfThrones
Skill Identifier: 434klll3 Intent: <PlayVideo> VideoTitle: GameOfThrones with the "Intent: <PlayMusic> Album Name: GameofThrones" and "Intent: <PlayVideo> VideoTitle: GameofThrones" portions of the data corresponding to NLU output data.

In at least some embodiments, the shortlister component 410 (of the NLU component 260) and the skill proposer component may both be implemented by the system 120. In such instances, the shortlister component 410 and the skill proposer may process with respect to different skills. For example, in at least some embodiments, the shortlister component 410 may process with respect to skill systems 125 in communication with the system 120 (e.g., illustrated in FIG. 2 as being outside of the system 120), and the skill proposer may process with respect to skill components 290 implemented by the system 120 (e.g., illustrated in FIG. 2 as a component box within the system 120). In such embodiments, skill identifiers output by the shortlister component 410 (and associated NLU output data) may be merged with the skill identifiers and associated NLU output data (output by the skill proposer component) for further processing.

A skill may determine, based on received NLU output data and other data available to the skill, whether the skill is able to respond to the natural language input. For example, a skill may generate a pre-response indicating the skill can respond to the natural language input, indicating the skill may be able to respond to the natural language input (e.g., the indicating the skill needs more data to determine whether the skill can respond to the natural language input), or indicating the skill cannot respond to the natural language input (e.g., due to the skill experiencing a high processing load).

In situations where a skill's pre-response indicates the skill can or may be able to respond to the natural language input, the pre-response may also include various other data representing a strength of the skill's potential response to the natural language input. For example, such other data may indicate capabilities (e.g., output capabilities or components such as availability of a connected screen, loudspeaker, etc.) of a device to be used to output the skill's response; pricing data corresponding to a product or service the natural language input is requesting be purchased (or is requesting purchase data for); availability of a product the natural language input is requesting be purchased; whether there are shipping fees for a product the natural language input is requesting be purchased; whether the user 5 already has a profile and/or subscription with the skill; that the user 5 does not have a subscription with the skill, but that there is a free trial/tier the skill is offering; with respect to a taxi skill, a cost of a trip based on start and end locations, how long the user 5 would have to wait to be picked up, etc.; and/or other data available to the skill that is related to the skill's processing of the natural language input. In at least some embodiments, a skill's pre-response may include a flag (or other indicator) representing a strength of the skill's ability to personalize its response to the user 5.

In at least some embodiments, a skill's pre-response may be configured to a schema pre-defined by the system 120. By the system 120 requiring pre-responses to conform to a specific schema (e.g., by requiring skills to only be able to provide certain types of data in pre-responses), the system 120 may onboard new skills into the dynamic routing functionality described herein without needing to reconfigure one or more components each time a new skill is onboarded. Moreover, requiring pre-responses to conform to a schema limits the amount of values needed to be used to train and implement a machine learned model for ranking skills at runtime, as described herein below.

Referring again to FIG. 2, the system 120 may include one or more skill components 290 and/or may communicate with one or more skill systems 125 via one or more skill components 290. A skill component 290, skill system 125, and a combination of a skill component 290 and skill system 125 may be referred to herein as a "skill." A skill may be configured to execute with respect to NLU output data 485. For example, for an NLU hypothesis including a <GetWeather> intent, the system 120 (and more particularly the orchestrator component 230) may invoke a weather skill to determine and output weather information for a geographic location represented in a user profile or corresponding to a location of the device 110 that captured the corresponding natural language input. For further example, for an NLU hypothesis including a <BookRide> intent, the system 120 (and more particularly the orchestrator component 230) may invoke a taxi skill to book a requested ride. In another example, for an NLU hypothesis including a <BuyPizza> intent, the system 120 (and more particularly the orchestrator component 230) may invoke a restaurant skill to place an order for a pizza. A skill may operate in conjunction between the system 120 and other devices, such as the device 110, restaurant electronic ordering systems, taxi electronic booking systems, etc. in order to complete certain functions. Inputs to a skill may come from speech processing interactions or through other interactions or input sources.

A skill may be associated with a domain, a non-limiting list of which includes a smart home domain, a music domain, a video domain, a weather domain, a communications domain, a flash briefing domain, a shopping domain, and a custom domain.

The system 120 may include a TTS component 280 that generates audio data (e.g., synthesized speech) from text data using one or more different methods. Text data input to the TTS component 280 may come from a skill, the orchestrator component 230, or another component of the system 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to generate audio data including an artificial speech waveform. Parametric synthesis uses a computerized voice generator, sometimes called a vocoder.

The user recognition component 295 may recognize one or more users using various data. The user recognition component 295 may take as input the audio data 211 and/or the text data 213. The user recognition component 295 may perform user recognition by comparing speech characteristics, in the audio data 211, to stored speech characteristics of users. The user recognition component 295 may additionally or alternatively perform user recognition by comparing biometric data (e.g., fingerprint data, iris data, retina data, etc.), received by the system 120 in correlation with a natural language input, to stored biometric data of users. The user recognition component 295 may additionally or alternatively perform user recognition by comparing image data (e.g., including a representation of at least a feature of a user), received by the system 120 in correlation with a natural language input, with stored image data including representations of features of different users. The user recognition component 295 may perform other or additional user recognition processes, including those known in the art. For a particular natural language input, the user recognition component 295 may perform processing with respect to stored data of users associated with the device 110 that captured the natural language input.

The user recognition component 295 determines whether a natural language input originated from a particular user. For example, the user recognition component 295 may generate a first value representing a likelihood that a natural language input originated from a first user, a second value representing a likelihood that the natural language input originated from a second user, etc. The user recognition component 295 may also determine an overall confidence regarding the accuracy of user recognition processing.

The user recognition component 295 may output a single user identifier corresponding to the most likely user that originated the natural language input. Alternatively, the user recognition component 295 may output multiple user identifiers (e.g., in the form of an N-best list) with respective values representing likelihoods of respective users originating the natural language input. The output of the user recognition component 295 may be used to inform NLU processing, processing performed by a skill, as well as processing performed by other components of the system 120 and/or other systems.

The system 120 may include profile storage 270. The profile storage 270 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; as well as other data. Data of a profile may additionally or alternatively include data representing a preferred assistant to respond to natural language inputs corresponding to the profile.

The profile storage 270 may include one or more user profiles. Each user profile may be associated with a different user identifier. Each user profile may include various user identifying data. Each user profile may also include preferences of the user. Each user profile may include one or more device identifiers, representing one or more devices registered to the user. Each user profile may include identifiers of skills that the user has enabled. When a user enables a skill, the user is providing the system 120 with permission to allow the skill to execute with respect to the user's natural language inputs. If a user does not enable a skill, the system 120 may not invoke the skill to execute with respect to the user's natural language inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may include one or more device profiles corresponding to one or more devices associated with the group profile.

The profile storage 270 may include one or more device profiles. Each device profile may be associated with a different device identifier. A device profile may include various device identifying data. A device profile may also include one or more user identifiers, corresponding to one or more user profiles associated with the device profile. For example, a household device's profile may include the user identifiers of users of the household.

Figure 5:
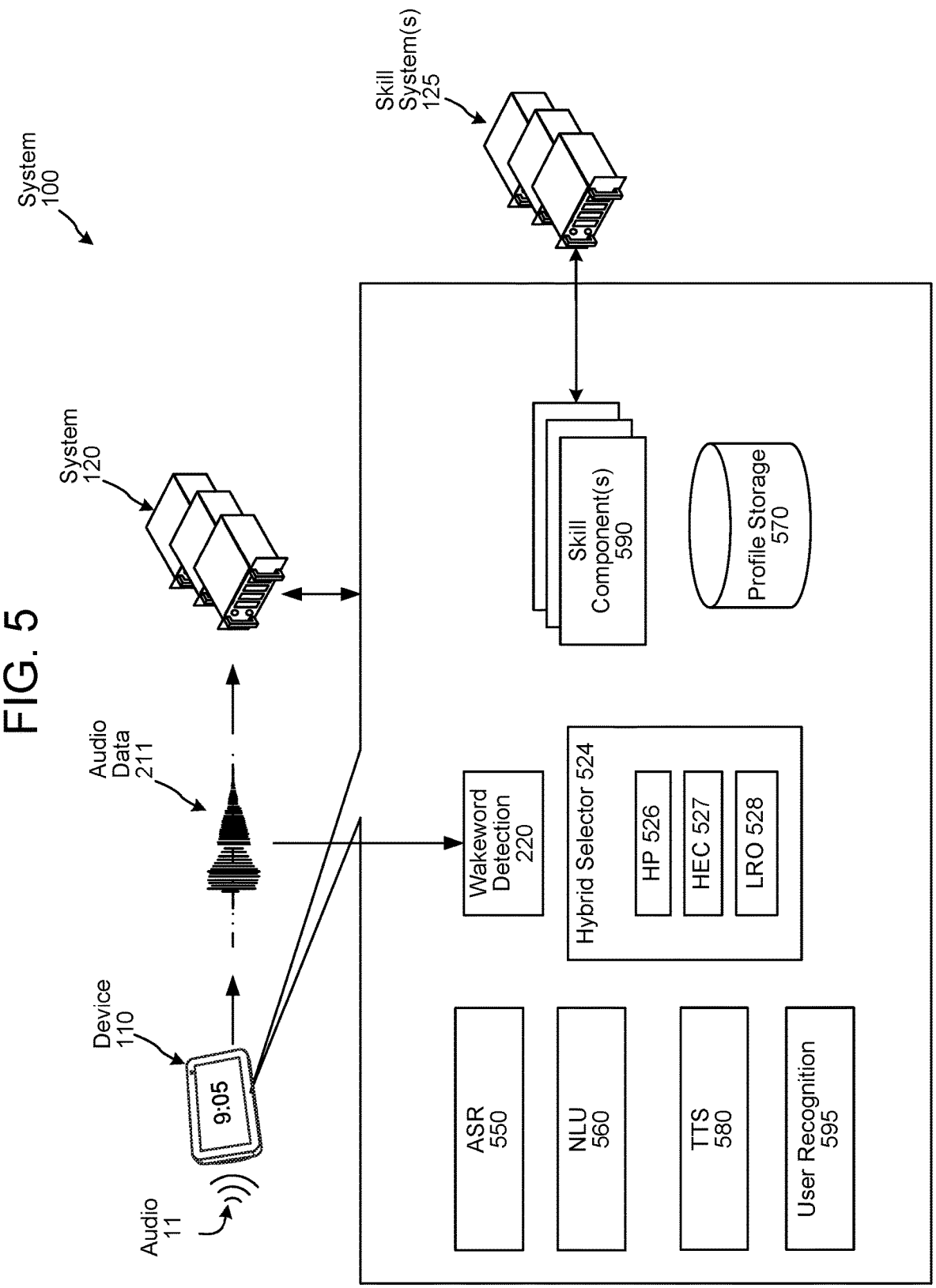
FIG. 5 is a conceptual diagram illustrating components that may be included in a device, according to embodiments of the present disclosure.

The foregoing describes illustrative components and processing of the system 120. In at least some embodiments, the device 110 may be configured to include some or all of the components, and perform some or all of the processing, of the system 120 described above. FIG. 5 illustrates such a configured device 110.

In at least some embodiments, the system 120 may receive the audio data 211 from the device 110, to recognize speech corresponding to a spoken input in the received audio data 211, and to perform functions in response to the recognized speech. In at least some embodiments, these functions involve sending directives (e.g., commands), from the system 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output an audible response (e.g., using TTS processing performed by an on-device TTS component 580) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a nearby device (e.g., a directive to turn on a smart light). It is to be appreciated that the system 120 may be configured to provide other functions in addition to those discussed herein, such as, without limitation, providing step-by-step directions for navigating from an origin to a destination location, conducting an electronic commerce transaction on behalf of the user 5 as part of a shopping function, establishing a communication session between the user 5 and another user, and so on.

As noted with respect to FIG. 2, the device 110 may include a wakeword detection component XA20 configured to compare the audio data 211 to stored models used to detect a wakeword (e.g., "Alexa") that indicates to the device 110 that the audio data 211 is to be processed for determining NLU output data (e.g., slot data that corresponds to a named entity, label data, and/or intent data, etc.). In at least some embodiments, a hybrid selector 524, of the device 110, may send the audio data 211 to the wakeword detection component 220. If the wakeword detection component 220 detects a wakeword in the audio data 211, the wakeword detection component 220 may send an indication of such detection to the hybrid selector 524. In response to receiving the indication, the hybrid selector 524 may send the audio data 211 to the system 120 and/or the ASR component 550. The wakeword detection component 220 may also send an indication, to the hybrid selector 524, representing a wakeword was not detected. In response to receiving such an indication, the hybrid selector 524 may refrain from sending the audio data 211 to the system 120, and may prevent the ASR component 550 from further processing the audio data 211. In this situation, the audio data 211 can be discarded.

The device 110 may conduct its own speech processing using on-device language processing components, such as an ASR component 550 and an NLU 560, similar to the manner discussed above with respect to the ASR component 250 and the NLU component 560 of the system 120. The device 110 may also internally include, or otherwise have access to, other components such as one or more skill components 590 capable of executing commands based on NLU output data or other results determined by the device 110/system 120, a user recognition component 595 (configured to process in a similar manner to that discussed above with respect to the user recognition component 295 of the system 120), profile storage 570 (configured to store similar profile data to that discussed above with respect to the profile storage 270 of the system 120), or other components. In at least some embodiments, the profile storage 570 may only store profile data for a user or group of users specifically associated with the device 110. Similar to as described above with respect to FIG. 2, a skill component 590 may communicate with a skill system(s) 125.

In at least some embodiments, the on-device language processing components may not have the same capabilities as the language processing components of the system 120. For example, the on-device language processing components may be configured to handle only a subset of the natural language inputs that may be handled by the system 120. For example, such subset of natural language inputs may correspond to local-type natural language inputs, such as those controlling devices or components associated with a user's home. In such circumstances the on-device language processing components may be able to more quickly interpret and respond to a local-type natural language input, for example, than processing that involves the system 120. If the device 110 attempts to process a natural language input for which the on-device language processing components are not necessarily best suited, the language processing results generated by the device 110 may indicate a low confidence or other metric indicating that the processing by the device 110 may not be as accurate as the processing done by the system 120.

The hybrid selector 524, of the device 110, may include a hybrid proxy (HP) 526 configured to proxy traffic to/from the system 120. For example, the HP 526 may be configured to send messages to/from a hybrid execution controller (HEC) 527 of the hybrid selector 524. For example, command/directive data received from the system 120 can be sent to the HEC 527 using the HP 526. The HP 526 may also be configured to allow the audio data 211 to pass to the system 120 while also receiving (e.g., intercepting) this audio data 211 and sending the audio data 211 to the HEC 527.

In at least some embodiments, the hybrid selector 524 may further include a local request orchestrator (LRO) 528 configured to notify the ASR component 550 about the availability of new audio data 211 that represents user speech, and to otherwise initiate the operations of local language processing when new audio data 211 becomes available. In general, the hybrid selector 524 may control execution of local language processing, such as by sending "execute" and "terminate" events/instructions. An "execute" event may instruct a component to continue any suspended execution (e.g., by instructing the component to execute on a previously-determined intent in order to generate a directive). Meanwhile, a "terminate" event may instruct a component to terminate further execution, such as when the device 110 receives directive data from the system 120 and chooses to use that remotely-generated directive data.

Thus, when the audio data 211 is received by the device 110, the HP 526 may allow the audio data 211 to pass through to the system 120 and the HP 526 may also input the audio data 211 to the on-device ASR component 550 by routing the audio data 211 through the HEC 527 of the hybrid selector 524, whereby the LRO 528 notifies the ASR component 550 of the audio data 211. At this point, the hybrid selector 524 may wait for response data from either or both of the system 120 or the local language processing components. However, the disclosure is not limited thereto, and in some examples the hybrid selector 524 may send the audio data 211 only to the local ASR component 550 without departing from the disclosure. For example, the device 110 may process the audio data 211 locally without sending the audio data 211 to the system 120.

The local ASR component 550 is configured to receive the audio data 211 from the hybrid selector 524, and to recognize speech in the audio data 211, and the local NLU component 560 is configured to determine a user intent from the recognized speech, and to determine how to act on the user intent by generating NLU output data which may include directive data (e.g., instructing a component to perform an action). Such NLU output data may take a form similar to that as determined by the NLU component 260 of the system 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data that is generated by a local language processing component (and/or the system 120) may be formatted using Java, such as JavaScript syntax, or JavaScript-based syntax. This may include formatting the directive using JSON. In at least some embodiments, a device-generated directive may be serialized, much like how remotely-generated directives may be serialized for transmission in data packets over the network(s) 199. In at least some embodiments, a device-generated directive may be formatted as a programmatic API call with a same logical operation as a remotely-generated directive. In other words, a device-generated directive may mimic a remotely-generated directive by using a same, or a similar, format as the remotely-generated directive.

An NLU hypothesis (output by the NLU component 560) may be selected as usable to respond to a natural language input, and local response data may be sent (e.g., local NLU output data, local knowledge base information, internet search results, and/or local directive data) to the hybrid selector 524, such as a "ReadyToExecute" response. The hybrid selector 524 may then determine whether to use directive data from the on-device components to respond to the natural language input, to use directive data received from the system 120, assuming a remote response is even received (e.g., when the device 110 is able to access the system 120 over the network(s) 199), or to generate output audio requesting additional information from the user 5.

The device 110 and/or the system 120 may associate a unique identifier with each natural language input. The device 110 may include the unique identifier when sending the audio data 211 to the system 120, and the response data from the system 120 may include the unique identifier to identify which natural language input the response data corresponds.

In at least some embodiments, the device 110 may include, or be configured to use, one or more skill components 590 that may work similarly to the skill component(s) 290 implemented by the system 120. The skill component(s) 590 may correspond to one or more domains that are used in order to determine how to act on a spoken input in a particular way, such as by outputting a directive that corresponds to the determined intent, and which can be processed to implement the desired operation. The skill component(s) 590 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill systems 125. For example, a skill system 125 may be located in a remote environment (e.g., separate location) such that the device 110 may only communicate with the skill system 125 via the network(s) 199. However, the disclosure is not limited thereto. For example, in at least some embodiments, a skill system 125 may be configured in a local environment (e.g., home server and/or the like) such that the device 110 may communicate with the skill system 125 via a private network, such as a local area network (LAN).

As used herein, a "skill" may refer to a skill component 590, a skill system 125, or a combination of a skill component 590 and a corresponding skill system 125.

A finite state transducer (FST) for NLU may refer to a data structure that may include grammars representing user inputs as paths that may be traversed during NLU processing (such FSTs may be referred to as grammar FSTs). Slot FSTs refers to a type of FST that contains entities that get the same label and are expected to behave similarly in corresponding user inputs (e.g., "sting," "Madonna," and "the Beatles" are all artist names, and may all appear in phrase such as "play music by X"). A grammar and slot FST may include grammars and slot/entity values. As used herein, a "grammar" (with respect to NLU) may refer to one or more intent indicators, with each intent indicator being associated with one or more slots. As used herein, a "slot" may refer to an expected portion of a user input corresponding to an intent indicator.

The FST may include data corresponding to many different potential NLU outputs that the system may determine as a result of a particular user input. During runtime the system may use a user input to determine a path through the FST (i.e., traverse the FST) to determine a set of nodes most likely to correspond to the user input. In an example, a model building component (e.g., 645) may generate an FST representing one or more natural language user inputs.

An NLU component may include the following components: a named entity recognition (NER) model(s), an intent classification (IC) model(s), a language model(s) (comprising a NER model and an IC model), an exact match rule(s) (MRs), a finite state transducer(s) (FSTs), or other components for use in runtime NLP processing. At runtime, if a NLU component 260 determines ASR output data, fed into to the NLU component 260, that matches the MR (e.g., the intent and entities corresponding to the MR), the NLU component 260 is configured to resolve the user input to the MR. In other words, an MR enables the NLU component 260 to identify when a user input corresponds to a specific intent and entity(ies), without having to process the user input using statistical models to predict that the user input corresponds to a particular intent and entity(ies).

Figure 6:
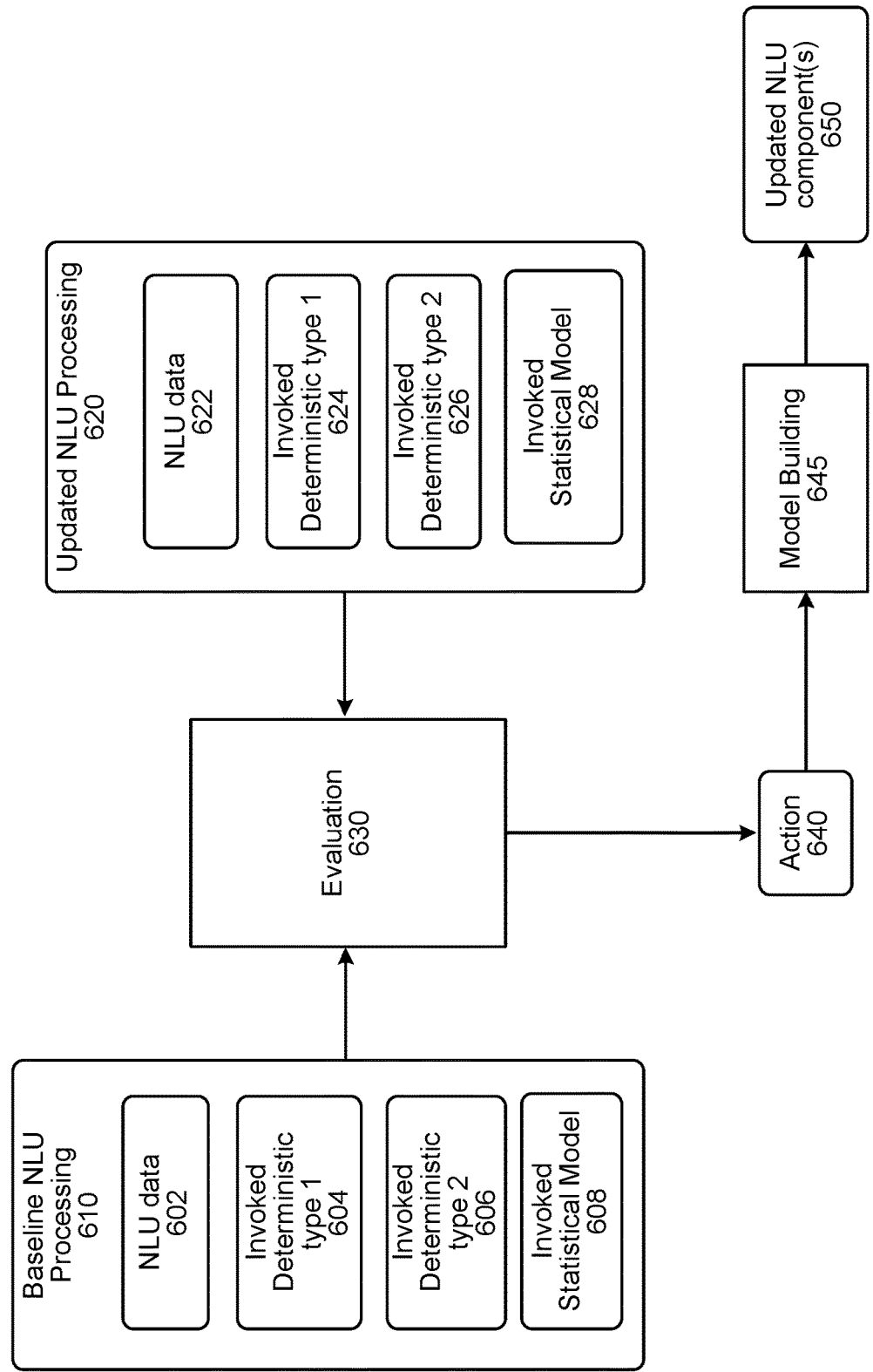
FIG. 6 is a conceptual diagram illustrating a system for determining an action to resolve issues with updated NLU components and generating updated NLU components, according to embodiments of the present disclosure.

FIG. 6 is a conceptual diagram illustrating a system for resolving issues with updated NLU components and for generating updated NLU components. One or more components shown in FIG. 6 may be included in the remote system 115. An evaluation component 630 may be included in the remote system 115 and configured to determine an action to resolve one or more issues preventing an updated NLU component from successfully processing a user input. The evaluation component 630 may receive baseline NLU processing data 610 and updated NLU processing data 620. The baseline NLU processing data 610 may represent data determined during processing of a user input by a baseline NLU component. The updated NLU processing data 620 may represent data determined during processing of a user input by an updated NLU component (corresponding to the baseline NLU component, but with at least one altered subcomponent). For example, the baseline NLU component may be the NLU component 260 used by the NLP system 120 to process runtime user inputs, and the updated NLU component may be a modified version of the NLU component 260, where the modifications may be made to incorporate processing of additional user inputs or to incorporate changes to processing of user inputs the baseline NLU component is already configured to process.

In some embodiments, an NLU component, as described herein, may include one or more deterministic components, such as, a FST, a negative FST, and a MR. FSTs may be configured to process particular types of user inputs (e.g., simple commands or requests, such as "turn on the light" or "what is the weather?") and route them to particular downstream components (e.g., domains). Negative FSTs may be configured to process certain types of user inputs and determine to not route them to a specific domain. For example, negative FSTs may be used to handle certain out-of-domain user inputs, so that when the user input is processed by the negative FST it is not routed to the specified domain. The NLU component may also include one or more MRs. An MR may be text data, tokens, etc. corresponding to a user input. At runtime, a system may attempt to exactly match text data, tokens, etc. (corresponding to a received user input) to that of the MR. The NLU component may also include one or more statistical models, which may be configured to process users input that may not be processed using FSTs and MRs.

The baseline NLU processing data 610 may include NLU data 602 the baseline NLU component determined as corresponding to the user input. The NLU data 602, for example, may be NLU output data 485. The NLU data 602 may include a NLU hypothesis (e.g., an intent, one or more slot values, etc.) and a confidence score associated with the NLU hypothesis.

The baseline NLU processing data 610 may also include invoked deterministic type 1 data 604. The invoked deterministic type 1 data 604 may indicate a first type of deterministic component (e.g., a FST or a negative FST) of the baseline NLU component that was used to process the user input. The invoked deterministic type 1 data 604 may include an component identifier, which may be an alphanumerical value or a name identifying the invoked deterministic component. In the case where a first type of deterministic component is not invoked, the invoked deterministic type 1 data 604 may be a null value or the invoked deterministic type 1 data 604 may not be included in the baseline NLU processing data 610.

The baseline NLU processing data 610 may include invoked deterministic type 2 data. The invoked deterministic type 2 data 606 may indicate a second type of deterministic component (e.g., MR) of the baseline NLU component that was used to process the user input. The invoked deterministic type 2 data 606 may include an component identifier, which may be an alphanumerical value or a name identifying the second type of deterministic component. In the case where a second type of deterministic component is not invoked, the invoked deterministic type 2 data 606 may be a null value or the invoked deterministic type 2 data 606 may not be included in the baseline NLU processing data 610.

The baseline NLU processing data 610 may include invoked statistical model data 608. The invoked statistical model data 608 may indicate a statistical model of the baseline NLU component that was used to process the user input. The invoked statistical model data 608 may include a statistical model identifier, which may be an alphanumerical value or a name identifying the statistical model. In the case where a statistical model is not invoked, the invoked statistical model data 608 may be a null value or the invoked statistical model data 608 may not be included in the baseline NLU processing data 610.

The updated NLU processing data 620 may include NLU data 622 the updated NLU component determined as corresponding to the user input. The NLU data 622 may include a NLU hypothesis (e.g., an intent, one or more slot values, etc.) and a confidence score associated with the NLU hypothesis.

The updated NLU processing data 620 may also include invoked deterministic type 1 data 624. The invoked deterministic type 1 data 624 may indicate a first type of deterministic component (e.g., a FST or a negative FST) of the updated NLU component that was used to process the user input. The invoked deterministic type 1 data 624 may include an component identifier, which may be an alphanumerical value or a name identifying the first type of deterministic component. In the case where an first type of deterministic component is not invoked, the invoked deterministic type 1 data 624 may be a null value or the invoked deterministic type 1 data 624 may not be included in the updated NLU processing data 620.

The updated NLU processing data 620 may include invoked deterministic type 2 data 626. The invoked deterministic type 2 data 626 may indicate an second type of deterministic component (e.g., a MR) of the updated NLU component that was used to process the user input. The invoked deterministic type 2 data 626 may include an component identifier, which may be an alphanumerical value or a name identifying the second type of deterministic component. In the case where an second type of deterministic component is not invoked, the invoked deterministic type 2 data 626 may be a null value or the invoked deterministic type 2 data 626 may not be included in the updated NLU processing data 620.

The updated NLU processing data 620 may include invoked statistical model data 628. The invoked statistical model data 628 may indicate a statistical model of the updated NLU component that was used to process the user input. The invoked statistical model data 628 may include a statistical model identifier, which may be an alphanumerical value or a name identifying the statistical model. In the case where a statistical model is not invoked, the invoked statistical model data 628 may be a null value or the invoked statistical model data 628 may not be included in the updated NLU processing data 620.

Based on processing the baseline NLU processing data 610 and the updated NLU processing data 620, the evaluation component 630 may determine an action 640 to perform. The action 640 may relate to updating a FST of the updated NLU component, generating an FST to add to the updated NLU component, updating an MR of the updated NLU component, generating an MR to add to the updated NLU component, and/or updating/retraining one or more statistical models of the updated NLU component. The different actions that may be performed are described in further details with respect to FIGS. 7A-7E.

The remote system 115 may invoke a model building component 645 to perform the action 640 and generate an updated NLU component(s) 650 (a second updated NLU component, a third updated NLU component, etc.). An updated NLU component 650a may be configured to process the user input and generate a desired response to the user input. In some embodiments, if the updated NLU component 650a does not generate a desired response to the user input, the evaluation component 630 may process data relating to the updated NLU component 650a to determine what further action can be performed to resolve the issue (resulting in the model building component 645 generating an updated NLU component 650b). Once an updated NLU component 650 is determined to process the user input successfully, that updated NLU component (which may be a second updated NLU component 650a, a third updated NLU component 650b, etc.) may be stored (or released) for online operations (i.e. to process incoming user inputs).

FIGS. 7A-7E are portions of a flowchart illustrating a process that the evaluation component 630 may use to determine which action 640 to perform based on the baseline NLU processing data 610 and the updated NLU processing data 620.

In some embodiments, the process begins by the evaluation component 630 determining (702) (using baseline NLU processing data 610) which component is invoked by the baseline NLU component during processing of the user input. If the invoked component is an MR, then the evaluation component 630 determines (704) (using updated NLU processing data 620) if the updated NLU component invoked an MR during processing of the user input. If an MR is invoked by the updated NLU component, then the evaluation component 630, by selecting the action 640, edits (706) the MR of the updated NLU component that processed the user input. The evaluation component 630 may edit the MR of the updated NLU component so that the user input is successfully processed by the MR to determine the desired response to the user input.

If the evaluation component 630 determines (at block 704) that the updated NLU component does not invoke an MR when processing the user input, then the evaluation component 630 determines (708) if a conflict is detected in the MRs during processing of the user input by the updated NLU component. In some cases, more than one MR may be applied to the user input because of the way the MRs are configured. The NLU component may include a rule that if more than one MR is applicable to a user input, then no MR is invoked (for example, as determined at block 704). If a conflict in MRs is detected, then the evaluation component 630, by selecting the action 640, removes (710) coverage of the conflicting MRs such that the conflicting MRs do not capture the user input. If n conflicts are detected, then n−1 MRs are updated to exclude processing of the user input.

If no conflicts are detected (at block 708) in invoking the MR by the updated NLU component, then the evaluation component 630 determines the action 640 from the list of possible actions 712, 714 and 716. The evaluation component 630 increases (712) coverage of the changed MR so that the user input is captured by the MR and processed to generate the desired response. The evaluation component 630 adds (714) a FST to the updated NLU component to capture the user input and generate the desired response. The evaluation component 630 adds (716) the user input to training data and causes retraining of a statistical model(s) of the updated NLU component. The training data may include a set of user inputs that correspond to the user input and are used as positive examples in the training data, so that the statistical model(s) is configured to capture the user input when processed by the updated NLU component.

In some embodiments, the evaluation component 630 may employ a self-learning policy engine using reinforcement learning or reward-based learning to select an action, based on the baseline NLU processing data 610 and the updated NLU processing data 620, from an action space. In some embodiments, the self-learning policy engine may use deep reinforcement learning combining artificial neural networks with a reinforcement learning architecture that enables the evaluation component 630 to learn the best action possible given a particular data state (represented by 610 and 620) in order to attain the particular goals of the evaluation component 630. The self-learning policy engine may combine function approximation and target optimization by mapping state-action pairs to expected rewards. For example, the evaluation component 630 may select the action 640 from the action space including actions 712, 714, and 716. At a later time, the evaluation component 630 may receive a reward signal indicating a reward or penalty associated with the selected action 640, and the evaluation component 630 updates the self-learning policy accordingly to facilitate selection of the action 640 with respect to actions 712, 714 and 716.

If, instead, the evaluation component 630 determines the baseline invoked component is not an MR at block 702, the evaluation component 630 determines (724) whether the invoked baseline NLU component is an FST. If yes, the evaluation component 630 determines (725) whether the updated NLU component invoked an MR. If yes, then the evaluation component 630 selects the action 640 of block 722. The evaluation component 630 updates (722) the changed MR of the updated NLU component to reduce coverage/exclude the user input from being captured by the MR of the updated NLU component. Thus, the evaluation component 630 determines that the undesired response to the user input by the updated NLU component is caused because the baseline NLU component processes the user input using a FST but the updated NLU component processes the user input using an MR.

Figure 7A:
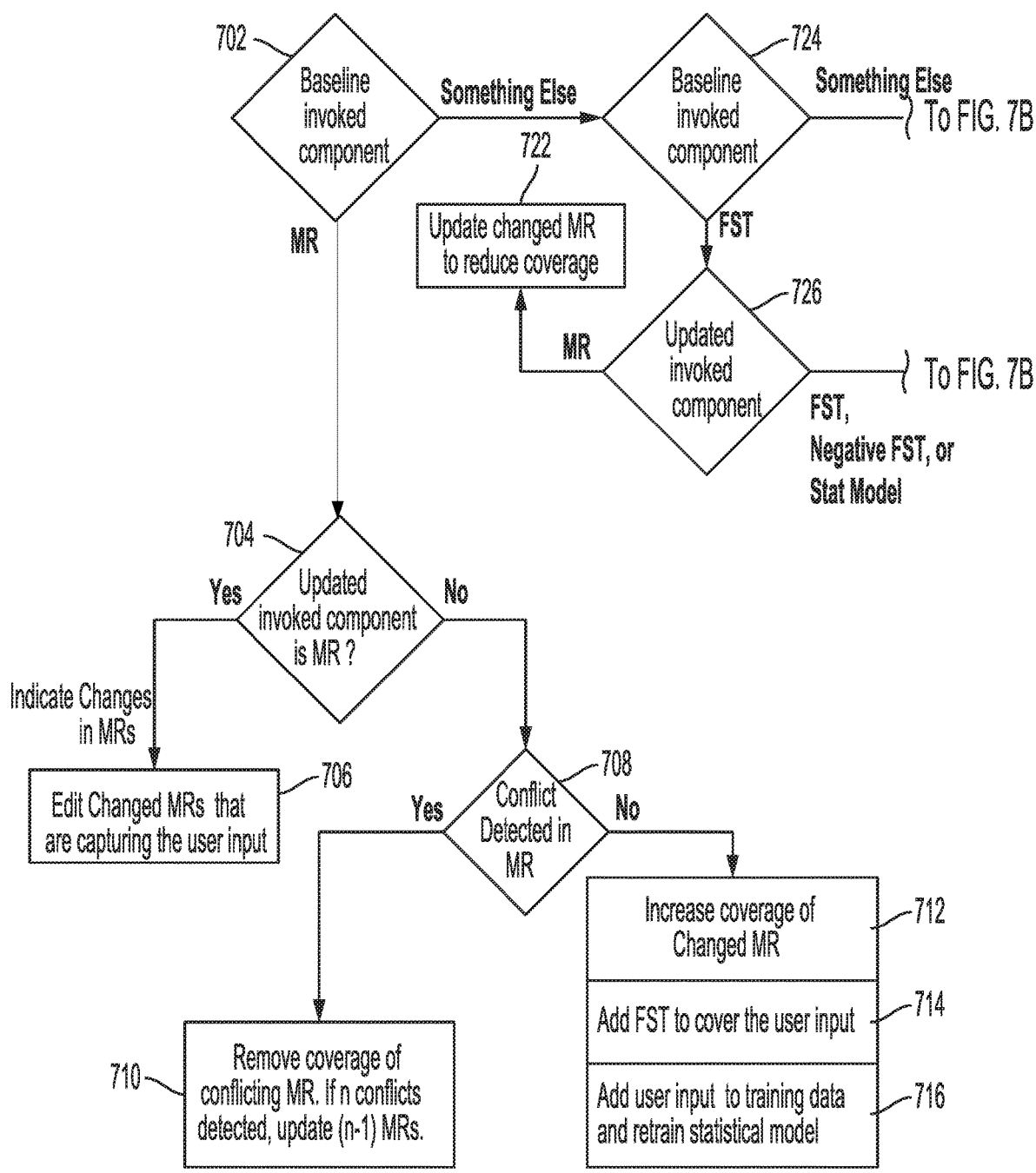
FIGS. 7A-7E are a flowchart illustrating a process for determining an action to resolve issues with updated NLU components, according to embodiments of the present disclosure.
Figure 7B:
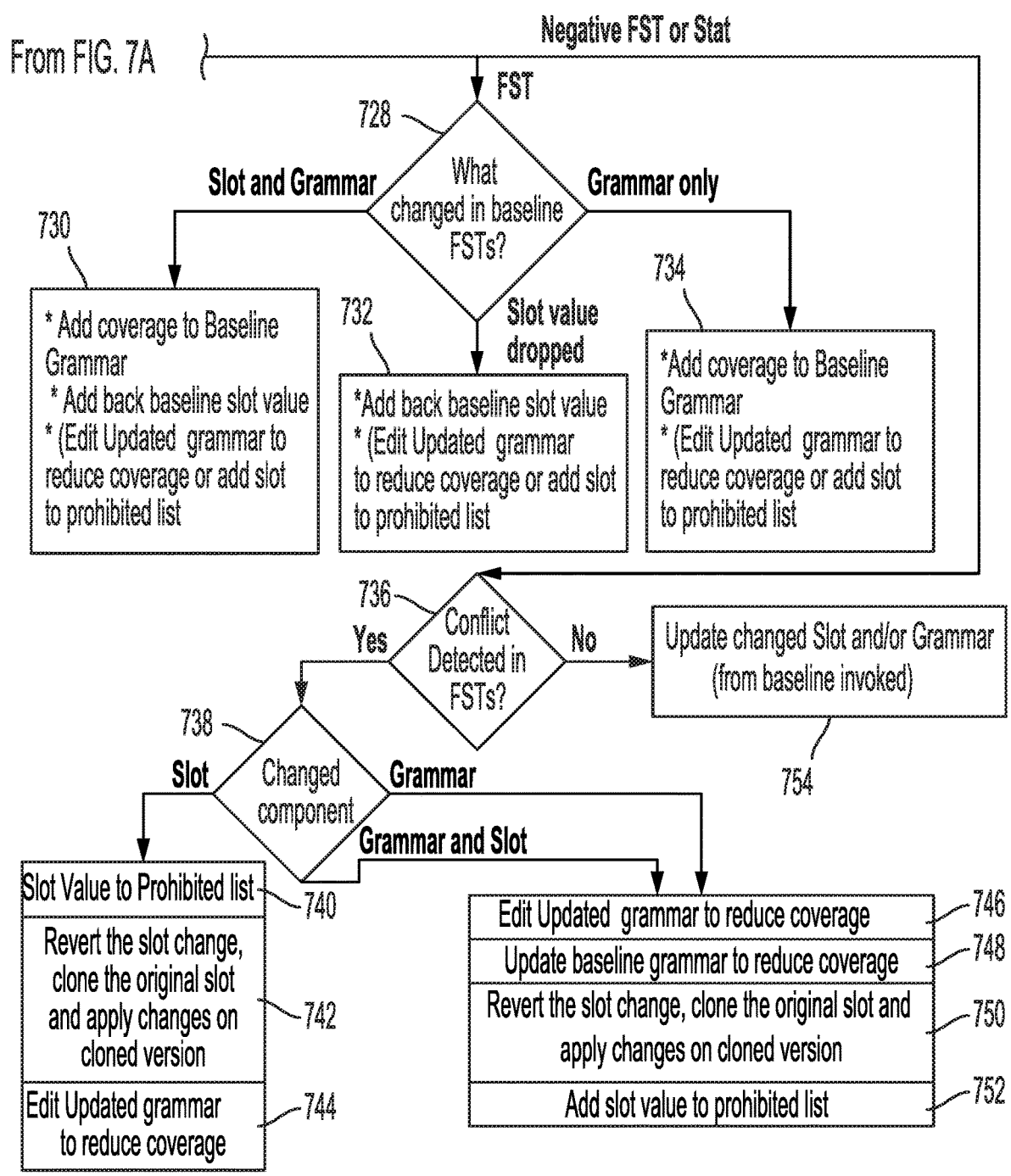
Figure 7C:
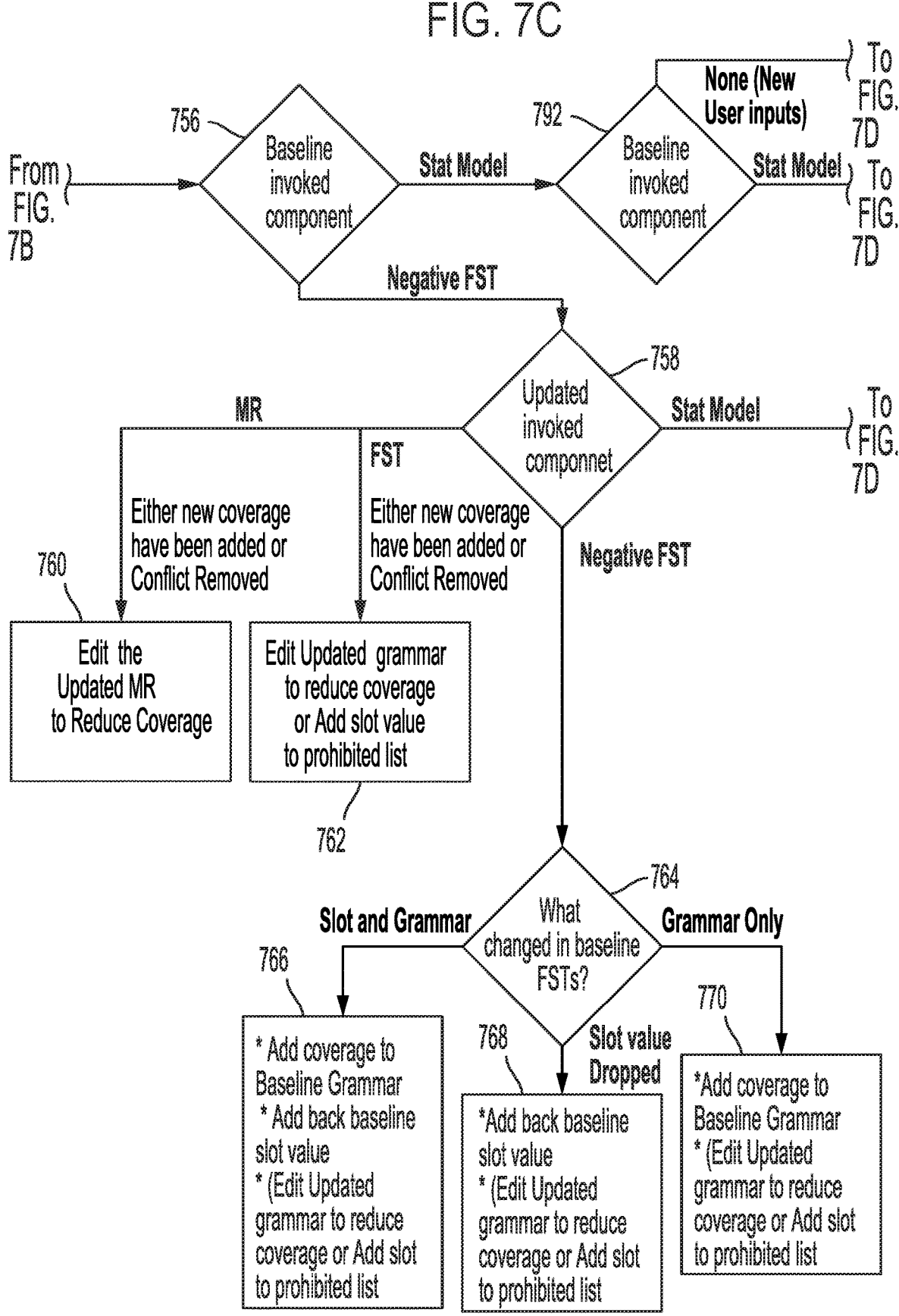

At block 724, if the baseline NLU component invoked a component other than an MR and FST (for example, a statistical model) then the process continues to block 756 of FIG. 7C. At block 726, if the updated NLU component invoked a FST, then the process continues to block 728 of FIG. 7B. If the updated NLU component invoked a negative FST or a statistical model, then the process continues to block 736 of FIG. 7B.

At block 728 (illustrated in FIG. 7B), the evaluation component 630 determines what changes are made to the FST(s) of the baseline NLU component to arrive to the FST(s) of the updated NLU component. That is, the evaluation component 630 compares the FST(s) of the baseline NLU component with the FST(s) of the updated NLU component to determine one or more differences, and determine what those differences relate to. If the difference relates to slots and grammar, then the evaluation component 630, by selecting the action 640 at block 730, adds coverage to a grammar FST of the baseline NLU component, so that the user input is captured by the grammar FST, and includes the updated grammar FST in the updated NLU component. The evaluation component 630 may alternatively add any coverage for slot values that were removed as compared to the baseline NLU component. The evaluation component 630 may alternatively edit the grammar FST of the updated NLU component to reduce coverage or add the slot value to a prohibited list in the updated NLU component. A prohibited list may include one or more slot values that are not allowed for a particular intent and/or slot type. The NLU component, when processing a user input, may not resolve a portion of the input to a slot value on the prohibited list.

If the change (determined at block 728) relates to a slot value being dropped/excluded in the updated NLU component, then the evaluation component 630, by selecting the action 640 at block 732, adds back the removed slot value to the FST of the updated NLU component. The evaluation component 630 may alternatively edit the grammar FST of the updated NLU component to reduce coverage of the slot value or add the slot value to a prohibited list in the updated NLU component.

If the change (determined at block 728) relates to changes in a grammar FST only, then the evaluation component 630, by selecting the action 640 at block 734, adds coverage to the grammar FST of the baseline NLU component and adds the updated grammar FST to the updated NLU component, or the evaluation component 630 edits the FST grammar of the updated NLU component to reduce coverage, or add the slot value to a prohibited list in the updated NLU component so that the particular slot and grammar combination is not recognized by the updated NLU component.

At block 736, the evaluation component 630 determines if a conflict is detected in FST(s). A conflict is detected when the updated NLU component invokes more than one FST to process the user input. If a conflict exists, then the evaluation component 630, at block 738, determines which component is changed between the baseline NLU component and the updated NLU component. If a slot FST is changed, then the evaluation component 630 selects the action 640 from actions 740, 742 and 744. At block 740, if selected, the slot value is added to a prohibited list for the updated NLU component. At block 742, if selected, the change made to the slot FST is reverted/removed, the corresponding slot FST of the baseline NLU component is cloned/duplicated (e.g., the FST invoked during processing by the baseline NLU component is cloned), and changes are made to the cloned FST, which is added to the updated NLU component, to capture the user input. At block 744, if selected, the grammar FST of the updated NLU component is edited to reduce coverage/exclude the user input from being captured by the grammar FST.

In some embodiments, the evaluation component 630 may employ (at block 738) a self-learning policy using reinforcement learning or reward-based learning to select an action, based on the baseline NLU processing data 610 and the updated NLU processing data 620, from an action space including actions 740, 742, and 744. At a later time, the evaluation component 630 may receive a reward signal indicating a reward or penalty associated with the selected action 640, and the evaluation component 630 updates the self-learning policy accordingly to facilitate selection of the action 640 with respect to actions 740, 742 and 744.

If the component changed (as determined at block 738) is a grammar FST or a grammar and slot FST, then the evaluation component 630 selects the action 640 from the actions 746, 748, 750, and 752. At block 746, edits are made to the grammar FST of the updated NLU component to reduce coverage/exclude the user input from being captured by the grammar FST. At block 748, the grammar FST (in the updated NLU component) corresponding to the FST of the baseline NLU component that is invoked is updated to reduce coverage/exclude the user input from being captured. At block 750, if selected, the change made to the slot FST is reverted/removed, the corresponding slot FST of the baseline NLU component is cloned/duplicated (e.g., the FST invoked during processing by the baseline NLU component is cloned), and changes are made to the cloned FST, which is added to the updated NLU component, to capture the user input. At block 752, if selected, the slot value is added to a prohibited list for the updated NLU component.

In some embodiments, the evaluation component 630 may employ (at block 738) a self-learning policy using reinforcement learning or reward-based learning to select an action, based on the baseline NLU processing data 610 and the updated NLU processing data 620, from an action space including actions 746, 748, 750, and 752. At a later time, the evaluation component 630 may receive a reward signal indicating a reward or penalty associated with the selected action 640, and the evaluation component 630 updates the self-learning policy accordingly to facilitate selection of the action 640 with respect to actions 746, 748, 750, and 752.

If no conflict is detected (at block 736), the evaluation component 630, by selecting action 640 of block 754, updates the changes made to the slot and/or grammar FST that were invoked during processing by the baseline NLU component.

Referring to FIG. 7C, at block 756, the evaluation component 630 determines whether the baseline NLU component invoked a statistical model or a negative FST. If a negative FST was invoked, then the process continues to block 758, where the evaluation component 630 determines which component is invoked by the updated NLU component. If an MR is invoked, then the evaluation component 630, by selecting the action 640 of block 760, edits the invoked MR of the updated NLU component to reduce coverage/exclude processing of the user input by the invoked MR. If a FST is invoked (as determined at block 758) then the evaluation component 630, by selecting the action 640 of block 762, edits the grammar FST of the updated NLU component to reduce coverage/exclude processing of the user input or adds the slot value to a prohibited list in the updated NLU component.

If a negative FST is invoked (as determined at block 758), then the evaluation component 630 determines, at block 764, what change was made to the FSTs of the baseline NLU component to arrive to the FSTs of the updated NLU component. That is, the evaluation component 630 compares the FSTs of the baseline NLU component with the FSTs of the updated NLU component to determine one or more differences, and determine what those differences relate to. If the change relates to FSTs for slot and grammar, then the evaluation component 630, by selecting the action 740 at block 766, adds coverage to the grammar FST of the baseline NLU component, so that the user input is captured by the grammar FST, and includes the updated grammar FST in the updated NLU component. The evaluation component 630 also adds any coverage for slot values that were removed as compared to the baseline NLU component. The evaluation component 630 may also edit the grammar FST of the updated NLU component to reduce coverage or add the slot value to a prohibited list in the updated NLU component.

If the change (determined at block 764) relates to a slot value being dropped/excluded in the updated NLU component, then the evaluation component 630, by selecting the action 740 at block 768, adds back the removed slot value to the FST of the updated NLU component. The evaluation component 630 may also edit the grammar FST of the updated NLU component to reduce coverage of the slot value or add the slot value to a prohibited list in the updated NLU component. If the change (determined at block 764) relates to changes in a grammar FST only, then the evaluation component 630, by selecting the action 640 as block 770, adds coverage to the grammar FST of the baseline NLU component and adds the updated grammar FST to the updated NLU component, or the evaluation component 630 edits the FST grammar of the updated NLU component to reduce coverage or add the slot value to a prohibited list in the updated NLU component.

Figure 7D:
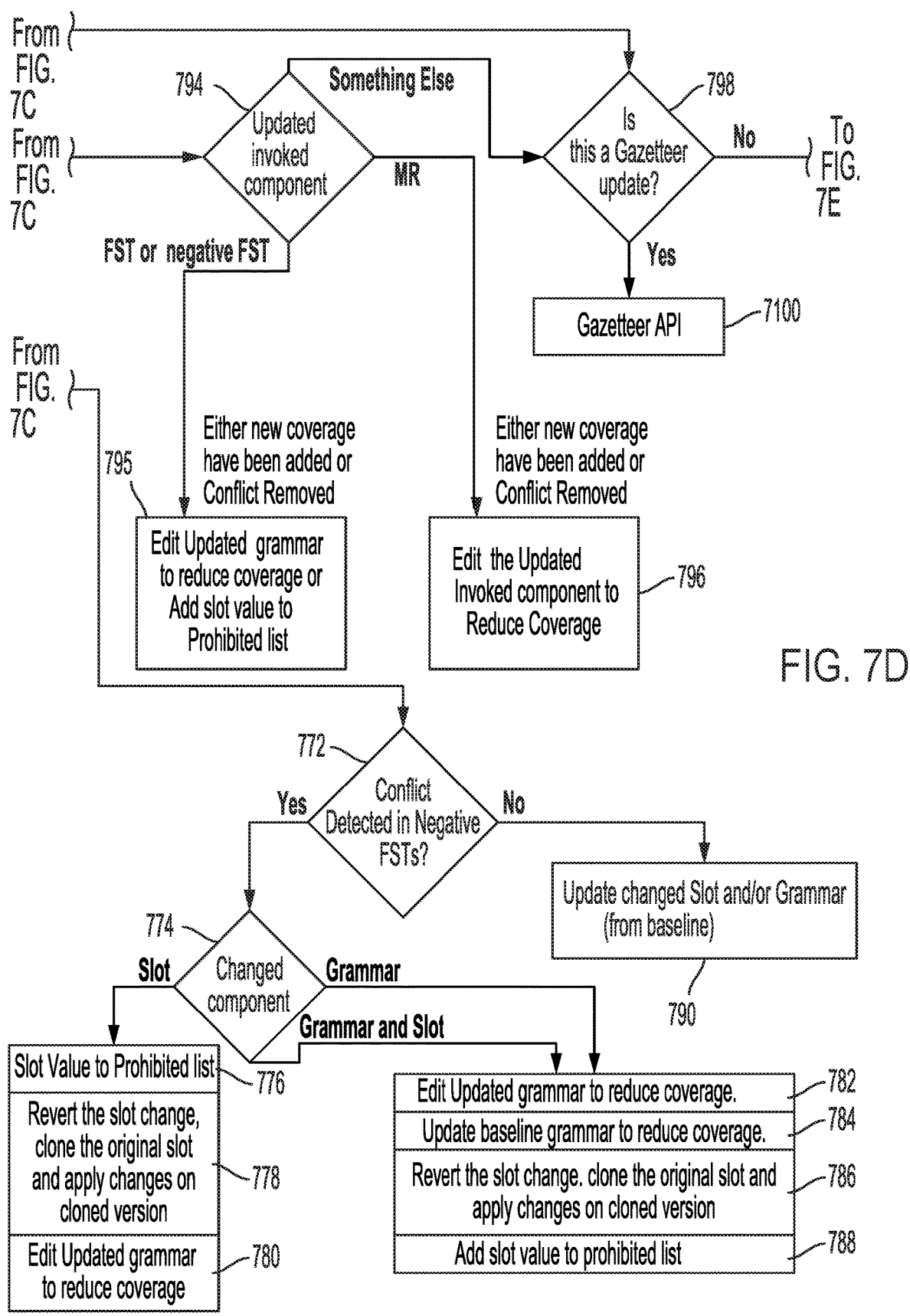

If the invoked component of the updated NLU component (determined at block 758) is statistical model, then the process continues to block 772 of FIG. 7D. If the invoked component of the baseline NLU component (determined at block 792) is a statistical model then the process also continues to block 794 of FIG. 7D. If no statistical model or other component of the baseline NLU component is invoked (determined at block 792), because the user input is a new user input that the updated NLU component is being configured to process and the baseline NLU component is not configured to process, then the process continues to block 798 of FIG. 7D.

At block 772, the evaluation component 630 determines if a conflict is detected in the negative FSTs. That is, the evaluation component 630 determines if more than one negative FST is invoked during processing of the user input by the updated NLU component. If yes, then the evaluation component 630 determines, at block 774, which component is changed as compared to the baseline NLU component. If a slot FST is changed, then the evaluation component 630 selects the action 640 from blocks 776, 778 and 780. At block 776, if selected, the slot value is added to a prohibited list for the updated NLU component. At block 778, if selected, the change made to the slot FST is reverted/removed, the corresponding slot FST of the baseline NLU component is cloned/duplicated (e.g., the FST invoked during processing by the baseline NLU component is cloned), and changes are made to the cloned FST, which is added to the updated NLU component, to capture the user input. At block 780, if selected, the grammar FST of the updated NLU component is edited to reduce coverage/exclude the user input from being captured by the grammar FST.

In some embodiments, the evaluation component 630 may employ (at block 774) a self-learning policy using reinforcement learning or reward-based learning to select an action, based on the baseline NLU processing data 610 and the updated NLU processing data 620, from an action space including blocks 776, 778, and 780. At a later time, the evaluation component 630 may receive a reward signal indicating a reward or penalty associated with the selected action 640, and the evaluation component 630 updates the self-learning policy accordingly to facilitate selection of the action 640 with respect to blocks 776, 778 and 780.

If the component changed (as determined at block 774) is a grammar FST or a grammar and slot FST, then the evaluation component 630 selects the action 640 from the blocks 782, 784, 786, and 788. At block 782, edits are made to the grammar FST of the updated NLU component to reduce coverage/exclude the user input from being captured by the grammar FST. At block 784, the grammar FST (in the updated NLU component) corresponding to the FST of the baseline NLU component that is invoked is updated to reduce coverage/exclude the user input from being captured. At block 786, if selected, the change made to the slot FST is reverted/removed, the corresponding slot FST of the baseline NLU component is cloned/duplicated (e.g., the FST invoked during processing by the baseline NLU component is cloned), and changes are made to the cloned FST, which is added to the updated NLU component, to capture the user input. At block 788, if selected, the slot value is added to a prohibited list for the updated NLU component.

In some embodiments, the evaluation component 630 may employ (at block 774) a self-learning policy using reinforcement learning or reward-based learning to select an action, based on the baseline NLU processing data 610 and the updated NLU processing data 620, from an action space including blocks 782, 784, 786, and 788. At a later time, the evaluation component 630 may receive a reward signal indicating a reward or penalty associated with the selected action 640, and the evaluation component 630 updates the self-learning policy accordingly to facilitate selection of the action 640 with respect to blocks 782, 784, 786, and 788.

If no conflict is detected at block 772, the evaluation component 630, by selecting action 640 of block 790, updates the changes made to the slot and/or grammar FST that were invoked during processing by the baseline NLU component.

At block 794, if the evaluation component 630 determines that the invoked component of the updated NLU component is a FST or a negative FST, then the evaluation component 630, by selecting the action 640 at block 795, edits the grammar FST to reduce coverage/exclude the user input from being captured by the FST or adds the slot value to a prohibited list in the updated NLU component. If the invoked component of the updated NLU component is an MR (determined at block 794), the evaluation component 630, by selecting the action 640 as block 796, edits the invoked MR of the updated NLU component to reduce coverage/exclude the user input from being captured by the MR.

If the updated NLU component invokes another component, such as a statistical model (instead of a FST or MR), determined at block 794, then the process continues to block 798, where the evaluation component 630 determines if the difference between the baseline NLU component and the updated NLU component relates to the gazetteer (e.g., 384). If yes, then the evaluation component 630 edits (7100) the gazetteer API, for example, by adding data corresponding to the user input so that the gazetteer(s) 384 recognizes the user input.

Figure 7E:
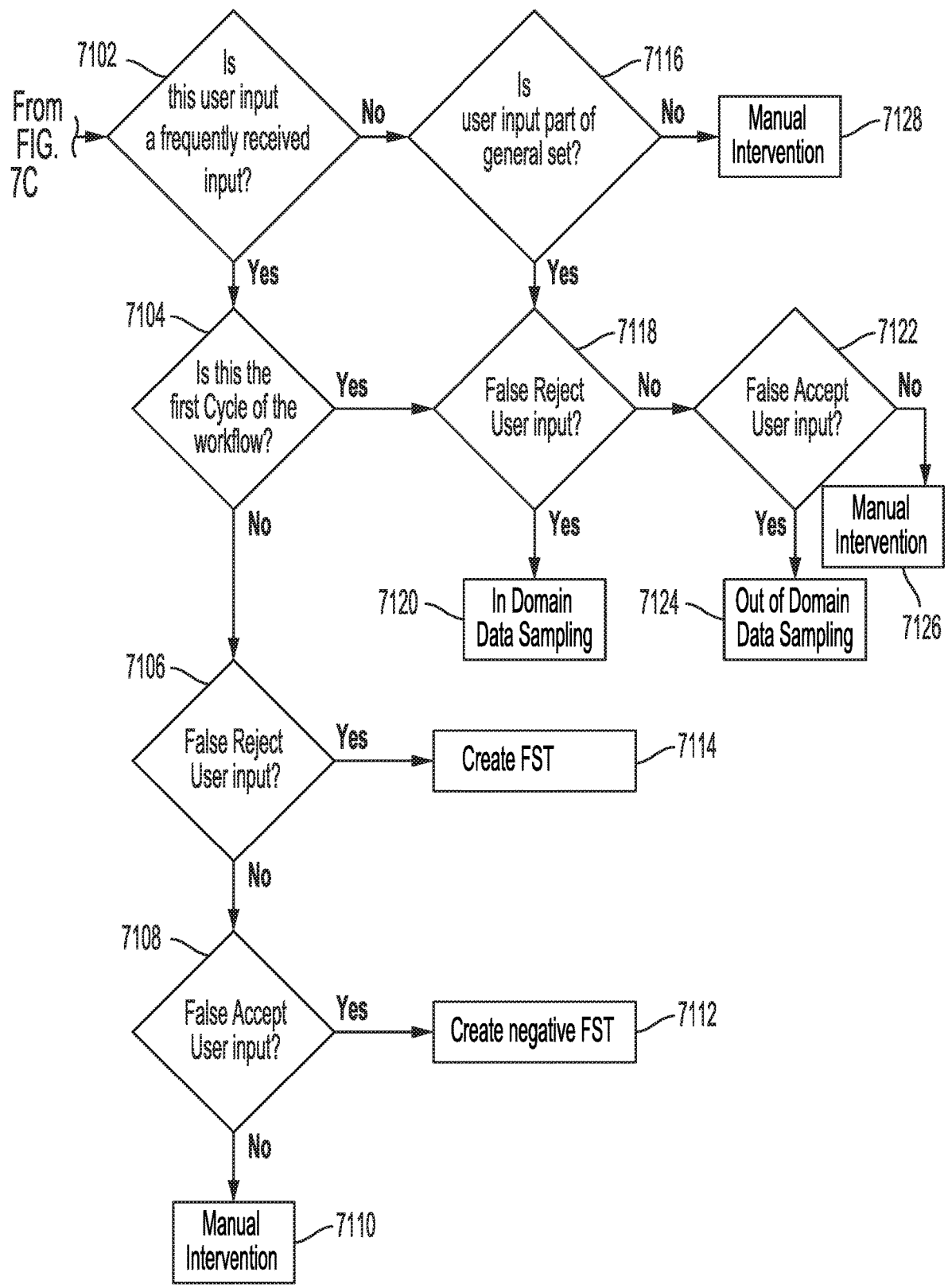

If the difference does not relate to the gazetteer, then the process continues to block 7102 of FIG. 7E. At block 7102, the evaluation component 630 determines if the user input is a frequently received input. The evaluation component 630 may use past user inputs stored at a database to determine how frequently a user input is received by the NLP system 120. If the frequency with which the user input is received by the NLP system 120 satisfies a threshold frequency, then the process continues to block 7104. The evaluation component 630, at block 7104, determines if this is a first cycle/iteration of the workflow for evaluating the particular updated NLU component. To do so, the evaluation component 630 may use an evaluation identifier (e.g., an alphanumeric value) to identify and track evaluation of a particular updated NLU component. The evaluation component 630 may associate the evaluation identifier with the updated NLU processing data 620 and also with the action 640 selected by the evaluation component 630.

If this is the first time the particular updated NLU component is being evaluated, then at block 7118, the evaluation component 630 determines if the user input is a false reject. A user input may be considered a false reject when the statistical model of the baseline NLU component determines NLU data corresponding to the user input with a higher confidence score than the statistical model of the updated NLU component does. In other words, the updated NLU component is capturing the user input with a lower confidence score than the baseline NLU component, resulting in a false reject. A lower confidence score associated with NLU data may affect processing by downstream components of the NLP system 120, which may result in an undesired response to the user input. The evaluation component 630 may make the determination at block 7118 using (by comparing) the NLU data 602 of the baseline NLU component and the NLU data 622 of the updated NLU component. At block 7118, the evaluation component 630 may compare the binned representation of the confidence scores of the NLU data 602 and NLU data 622, for example, the NLU data 602 may include data representing a high confidence value and the NLU data 622 may include data representing a medium or low confidence score. If the user input is a false reject, the evaluation component 630, by selecting the action 640 at block 7120, trains the statistical model of the updated NLU component with in-domain sampling data. In-domain sampling data may include a set of user inputs corresponding to the user input as positive samples for the statistical model so that the statistical model is configured to capture the user input with a higher confidence score. The set of user inputs in the in-domain sampling data may be user inputs similar to the user input being evaluated/false rejected, and the set of user inputs may be associated with appropriate weights/scores to configure the statistical model to capture the user input with a higher confidence score.

The retrained statistical model may be included in the (second) updated NLU component, which may be evaluated by the evaluation component 630 to determine whether processing of the user input generates a desired response. This cycle/iteration may be associated with the same evaluation identifier given that the updated NLU component is being evaluated in response to changes made by the evaluation component 630 with respect to the same user input. Based on the evaluation identifier, the evaluation component 630 at block 7104 determines that this is not the first cycle for evaluating the particular updated NLU component. In that case, at block 7106, the evaluation component 630 determines whether the user input is a false reject. If yes, then by selecting the action 640 as block 7114, the evaluation component 630 creates an FST corresponding to the user input to include in the updated NLU component, so that the user input is captured and processed by the FST to generate the desired response.

If the user input is not a false reject, then the evaluation component 630 determines if the user input is a false accept (at block 7108). A user input may be considered a false accept when the statistical model of the baseline NLU component determines NLU data corresponding to the user input with a lower confidence score than the statistical model of the updated NLU component does. In other words, the updated NLU component is capturing the user input with a higher confidence score than the baseline NLU component, resulting in a false accept. A higher confidence score associated with NLU data may affect processing by downstream components of the NLP system 120, which may result in an undesired response to the user input. The evaluation component 630 may make the determination at block 7108 using (by comparing) the NLU data 602 of the baseline NLU component and the NLU data 622 of the updated NLU component. The evaluation component 630 may compare the binned representations of the confidence scores, for example, the NLU data 602 may include data representing a low confidence value and the NLU data 622 may include data representing a medium or high confidence value. If the user input is a false accept at block 7108, the evaluation component 630, by selecting the action 640 at block 7112, creates a negative FST to include in the updated NLU component, so that the user input is disassociated with the particular intent and is not routed by the updated NLU component to the particular intent.

As shown in FIG. 7E, the evaluation component 630 creates a FST (block 7114) or a negative FST (block 7112) when the user input satisfies a threshold receipt frequency and a prior resolution of retraining the statistical model did not fix the issue with respect to processing of the user input.

If the user input is neither a false reject or a false accept, then the evaluation component 630 may output a signal at block 7110 indicating that manual intervention is required to resolve the issue.

If at block 7118 the user input is not a false reject, then the evaluation component 630 determines, at block 7122, if the user input is a false accept. If the user input is a false accept, then the evaluation component 630, by selecting the action 640 as block 7124, trains the statistical model of the updated NLU component with out-of-domain sampling data. Out-of-domain sampling data may include a set of user inputs corresponding to the user input as negative samples for the statistical model so that the statistical model is configured to capture the user input with a lower confidence score. The set of user inputs in the out-of-domain sampling data may be user inputs similar to the user input being evaluated/false accepted, and the set of user inputs may be associated with appropriate weights/scores to configure the statistical model to capture the user input with a lower confidence score.

If the user input is neither a false reject or a false accept, then the evaluation component 630 may output a signal at block 7126 indicating that manual intervention is required to resolve the issue.

If the user input is not a frequently received input (determined at block 7102), then the evaluation component 630 determines whether the user input is part of a general set of user inputs the NLU component is configured to process. A general set of user inputs may be less frequently received by the NLP system 120. If the user input of the general set is a false reject, as determined at block 7118, then the evaluation component 630 by selecting the action 640 at block 7120, trains the statistical model of the updated NLU component with in-domain sampling data (that may include a set of user inputs corresponding to the user input as positive samples). If the user input of the general set is a false accept, as determined at block 7122, then the evaluation component 630 by selecting the action 640 at block 7124, trains the statistical model of the updated NLU component with out-of-domain sampling data (that may include a set of user inputs corresponding to the user input as negative samples).

With the determinations at blocks 7102 and 7116, the evaluation component 630 may determine a tradeoff in resolving processing issues with respect to frequently received user inputs versus resolving processing issues with respect to less frequently received used inputs. For example, the evaluation component 630, for frequently received used inputs, attempts to resolve the issue by retraining the statistical model, and if that does not work, then generates an FST to handle processing of the user input. However, for less frequently received used inputs, the evaluation component 630 does not resolve the issue by generating FSTs, to avoid increasing the number of FSTs in the NLU component.

In some embodiments, the evaluation component 630 may select the action 640 based on which domain the user input corresponds to. For example, if the user input corresponds to the music domain, then the evaluation component 630, in some situations, may determine to retrain the statistical model rather than generating a FST. In another example, if the user input corresponds to the smart home domain, then the evaluation component 630, in some situations, may determine to generate a FST rather than retraining the statistical model.

With respect to certain decision blocks shown in FIGS. 7A-7E, the evaluation component 630 may employ a self-learning policy with reinforcement or reward-based learning to help determine which action to perform given the circumstances indicated by the data.

The process of updating models for natural language processing with the latest data or new features is a complex and time consuming process. Resolving failures during updating of models may require domain expertise and adequate experience. For example, if a model misclassifies the domain for a set of utterances, the system 115 chooses between updating deterministic models such as FSTs or MRs, training statistical models with particular data, or adjusting gating thresholds. Using the reinforcement learning (RL) paradigm, which is an area of machine learning concerned with how agents ought to take actions in an environment to maximize the cumulative reward, the system 115 may determine an action to perform to resolve a particular issue. The RL model may be optimized through a balance between exploring unknown territory and exploiting known information, and may include a policy which is a mapping from the state to an optimal action. Such an RL model may be trained through an approach called experience replay, which may use a set of tuples with four items [state, action, reward, next state]. The 'state' may be extracted as signals from the set of utterances that when processed by the updated models results in an undesired response. The 'action' may be one of the actions described above that the system 115 may perform to resolve the failure. The 'reward' may be a combination of the quantity of resolved failures and the generalization error. The generalization error may be measured on a hold-out test set including a set of utterances. In some embodiments, the RL model may use Deep Q-learning to optimize the policy.

Figure 8:
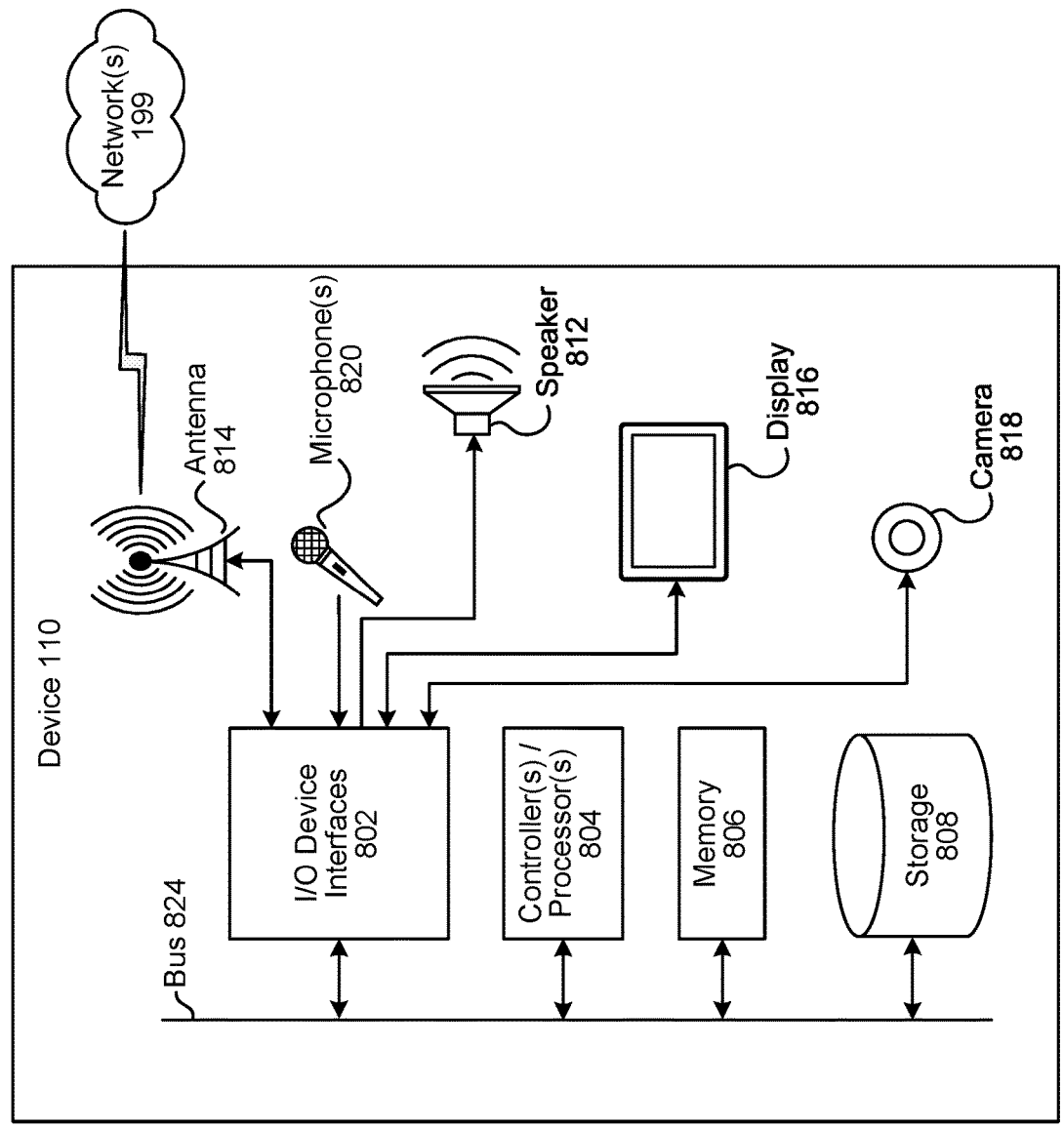
FIG. 8 is a block diagram conceptually illustrating example components of a device, according to embodiments of the present disclosure.
Figure 9:
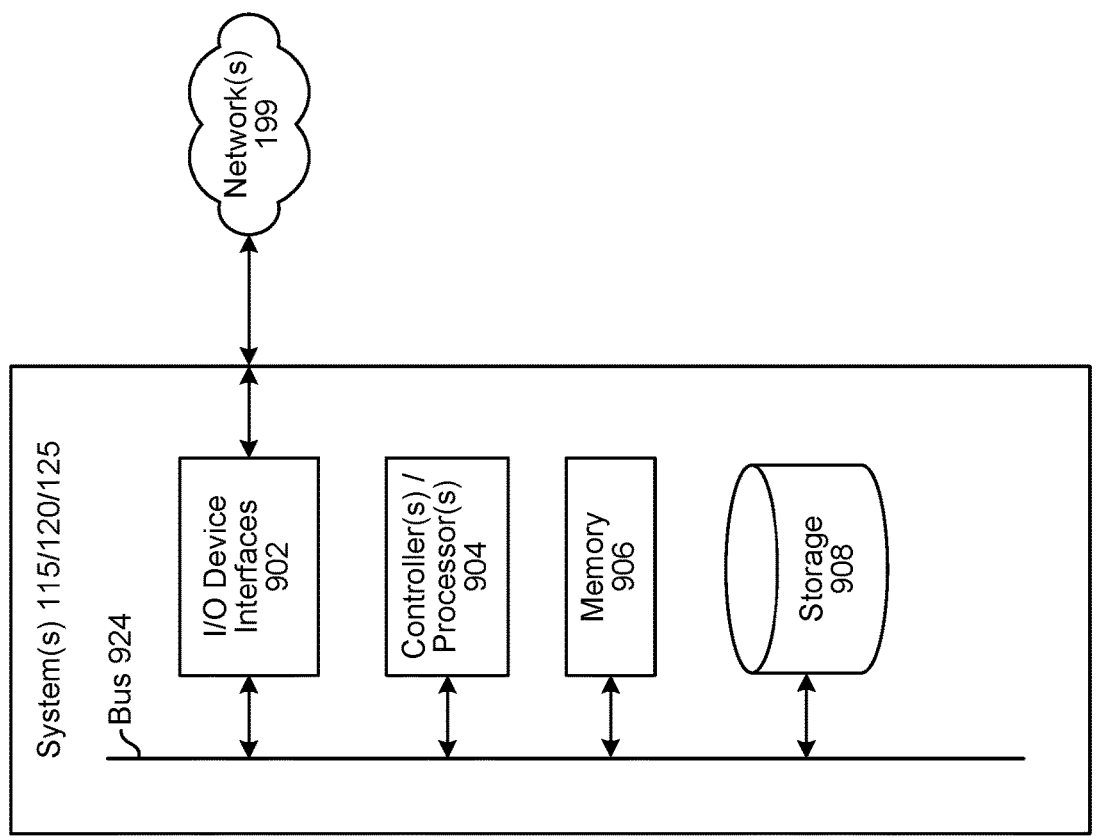
FIG. 9 is a block diagram conceptually illustrating example components of a system, according to embodiments of the present disclosure.

FIG. 8 is a block diagram conceptually illustrating example components of a device 110 according to the present disclosure. FIG. 9 is a block diagram conceptually illustrating example components of a system, such as the remote system 115, the NLP system 120 or the skill system 125. A system (115/120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The remote system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (115/120/125) may be included in the system 100 of the present disclosure, such as one or more remote systems 115 for configuring ML models and tuning parameter values, one or more NLP systems 120 for performing ASR processing, one or more NLP systems 120 for performing NLU processing, and one or more skill component 125, etc. In operation, each of these systems may include computer-readable and computer-executable instructions that reside on the respective device (115/120/125), as will be discussed further below.

Each of these devices (110/115/120/125) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), and/or other types of memory. Each device (110/115/120/125) may also include a data storage component (808/908) for storing data and controller/processor-executable instructions. Each data storage component (808/908) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (802/902).

Computer instructions for operating each device (110/115/120/125) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/115/120/125) includes input/output device interfaces (802/902). A variety of components may be connected through the input/output device interfaces (802/902), as will be discussed further below. Additionally, each device (110/115/120/125) may include an address/data bus (824/924) for conveying data among components of the respective device. Each component within a device (110/115/120/125) may also be directly connected to other components in addition to (or instead of) being connected to other components across the bus (824/924).

Referring to FIG. 8, the device 110 may include input/output device interfaces 802 that connect to a variety of components such as an audio output component such as a speaker 812, a wired headset or a wireless headset (not illustrated), or other component capable of outputting audio. The device 110 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 816 for displaying content. The device 110 may further include a camera 818.

Via antenna(s) 814, the input/output device interfaces 802 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical servers in a collection of servers or other components.

The components of the device 110, the remote system 115, the NLP system 120, and/or a skill component 125 may include their own dedicated processors, memory, and/or storage. Alternatively, one or more of the components of the device 110, the remote system 120, and/or a skill component 125 may utilize the I/O interfaces (802/902), processor(s) (804/904), memory (806/906), and/or storage (808/908) of the device(s) 110, the remote system 115, the NLP system 120, or the skill component 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the remote system 115, the NLP system 120, and a skill component 125, as described herein, are illustrative, and may be located as a stand-alone device or may be included, in whole or in part, as a component of a larger device or system.

Figure 10:
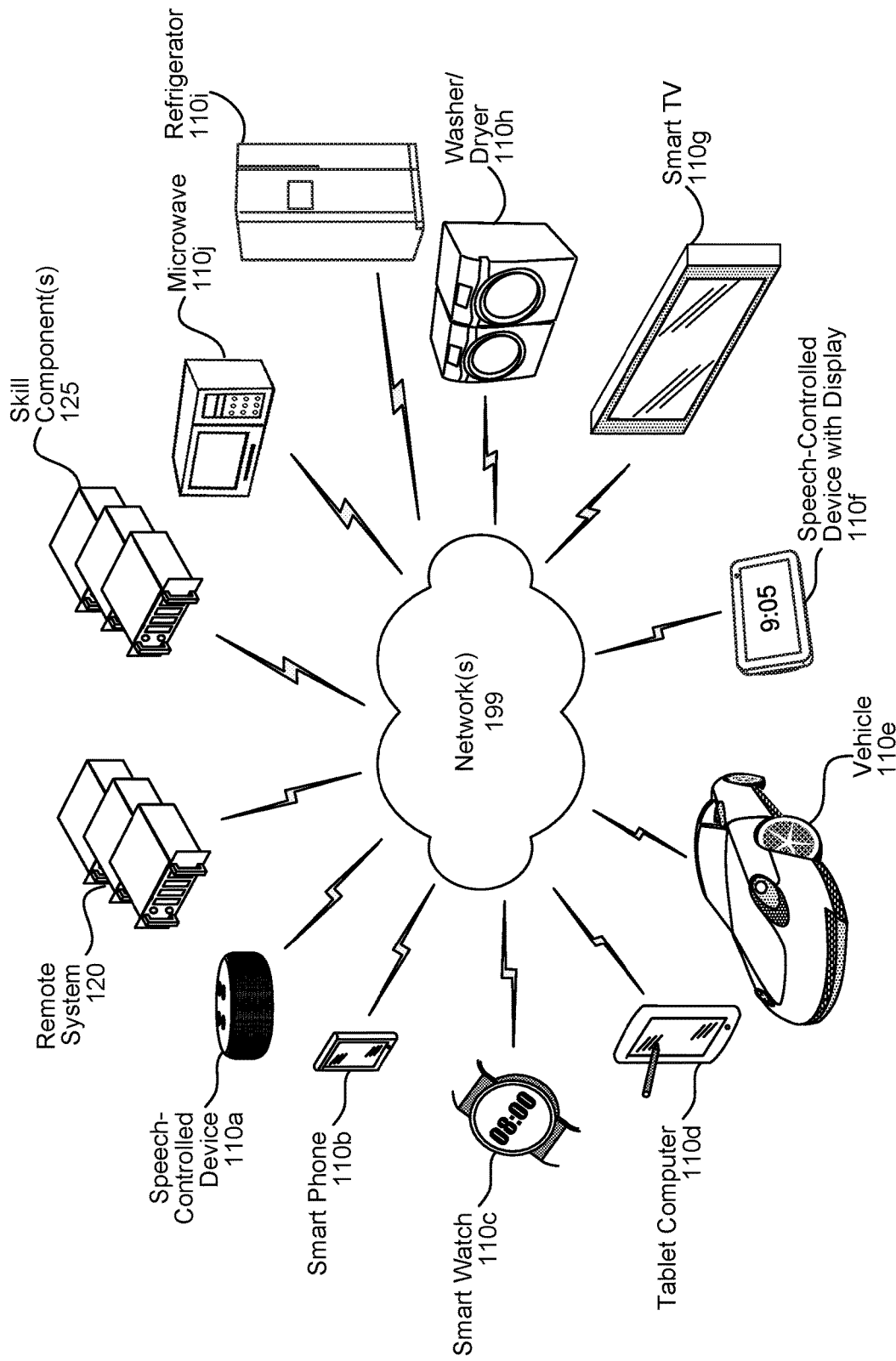
FIG. 10 illustrates an example of a computer network for use with the overall system, according to embodiments of the present disclosure.

As illustrated in FIG. 10, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a microwave 110j may be connected to the network(s) 199 through a wireless service provider, over a WiFi or cellular network connection, or the like. Other devices are included as network-connected support devices, such as the remote system 120, the skill component(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the remote system 120.

Figure 11:
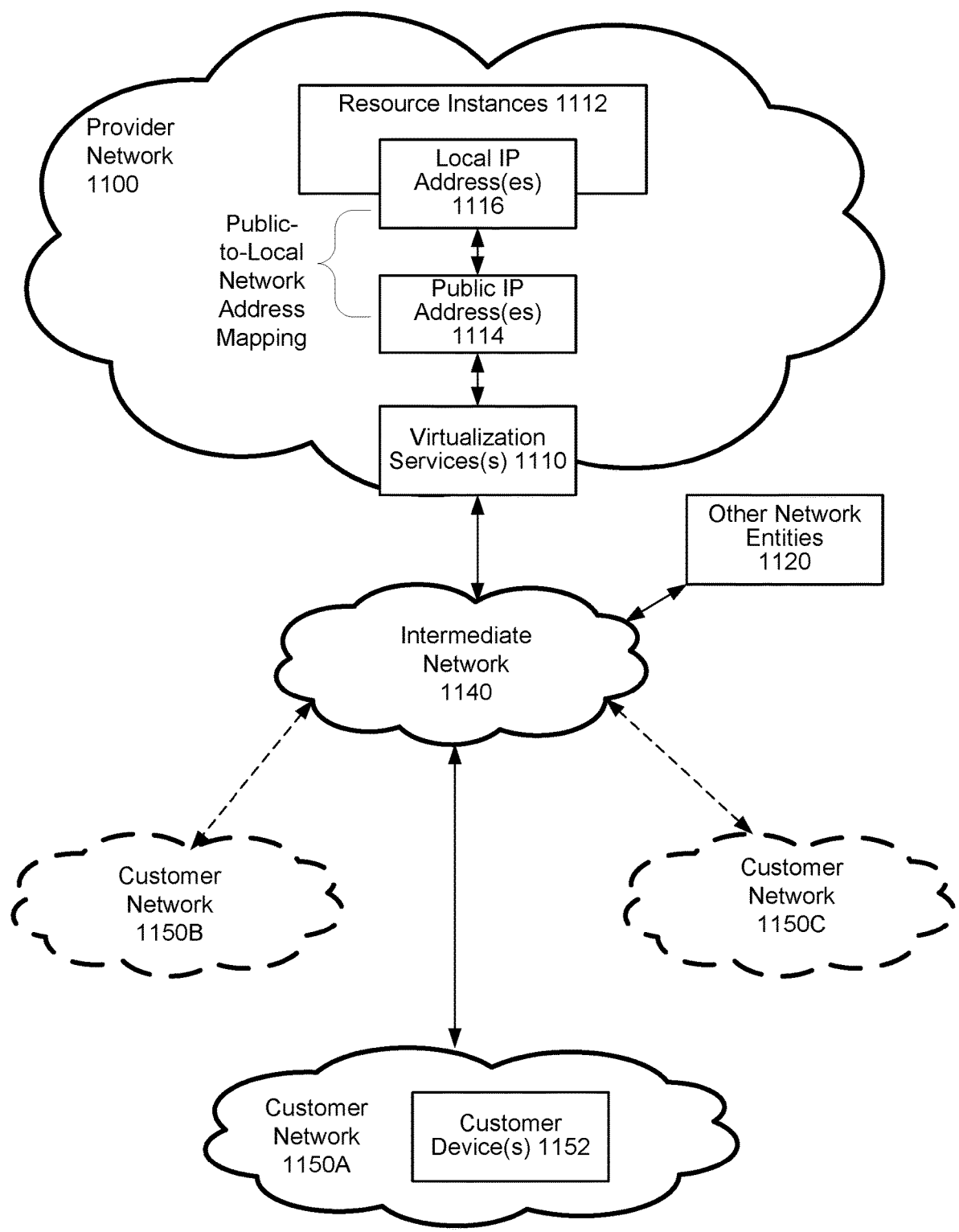
FIG. 11 illustrates an example provider network environment according to some embodiments.

FIG. 11 illustrates an example provider network (or "service provider system") environment according to some embodiments. A provider network 1100 may provide resource virtualization to customers via one or more virtualization services 1110 that allow customers to purchase, rent, or otherwise obtain instances 1112 of virtualized resources, including but not limited to computation and storage resources, implemented on devices within the provider network or networks in one or more data centers. Local Internet Protocol (IP) addresses 1116 may be associated with the resource instances 1112; the local IP addresses are the internal network addresses of the resource instances 1112 on the provider network 1100. In some embodiments, the provider network 1100 may also provide public IP addresses 1114 and/or public IP address ranges (e.g., Internet Protocol version 4 (IPv4) or Internet Protocol version 6 (IPv6) addresses) that customers may obtain from the provider 1100.

Conventionally, the provider network 1100, via the virtualization services 1110, may allow a customer of the service provider (e.g., a customer that operates one or more client networks 1150A-1150C including one or more customer device(s) 1152) to dynamically associate at least some public IP addresses 1114 assigned or allocated to the customer with particular resource instances 1112 assigned to the customer. The provider network 1100 may also allow the customer to remap a public IP address 1114, previously mapped to one virtualized computing resource instance 1112 allocated to the customer, to another virtualized computing resource instance 1112 that is also allocated to the customer. Using the virtualized computing resource instances 1112 and public IP addresses 1114 provided by the service provider, a customer of the service provider such as the operator of customer network(s) 1150A-1150C may, for example, implement customer-specific applications and present the customer's applications on an intermediate network 1140, such as the Internet. Other network entities 1120 on the intermediate network 1140 may then generate traffic to a destination public IP address 1114 published by the customer network(s) 1150A-1150C; the traffic is routed to the service provider data center, and at the data center is routed, via a network substrate, to the local IP address 1116 of the virtualized computing resource instance 1112 currently mapped to the destination public IP address 1114. Similarly, response traffic from the virtualized computing resource instance 1112 may be routed via the network substrate back onto the intermediate network 1140 to the source entity 1120.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1100; a customer may then assign their allocated public IP addresses to particular resource instances allocated to the customer. These public IP addresses may be referred to as customer public IP addresses, or simply customer IP addresses. Instead of being assigned by the provider network 1100 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 12:
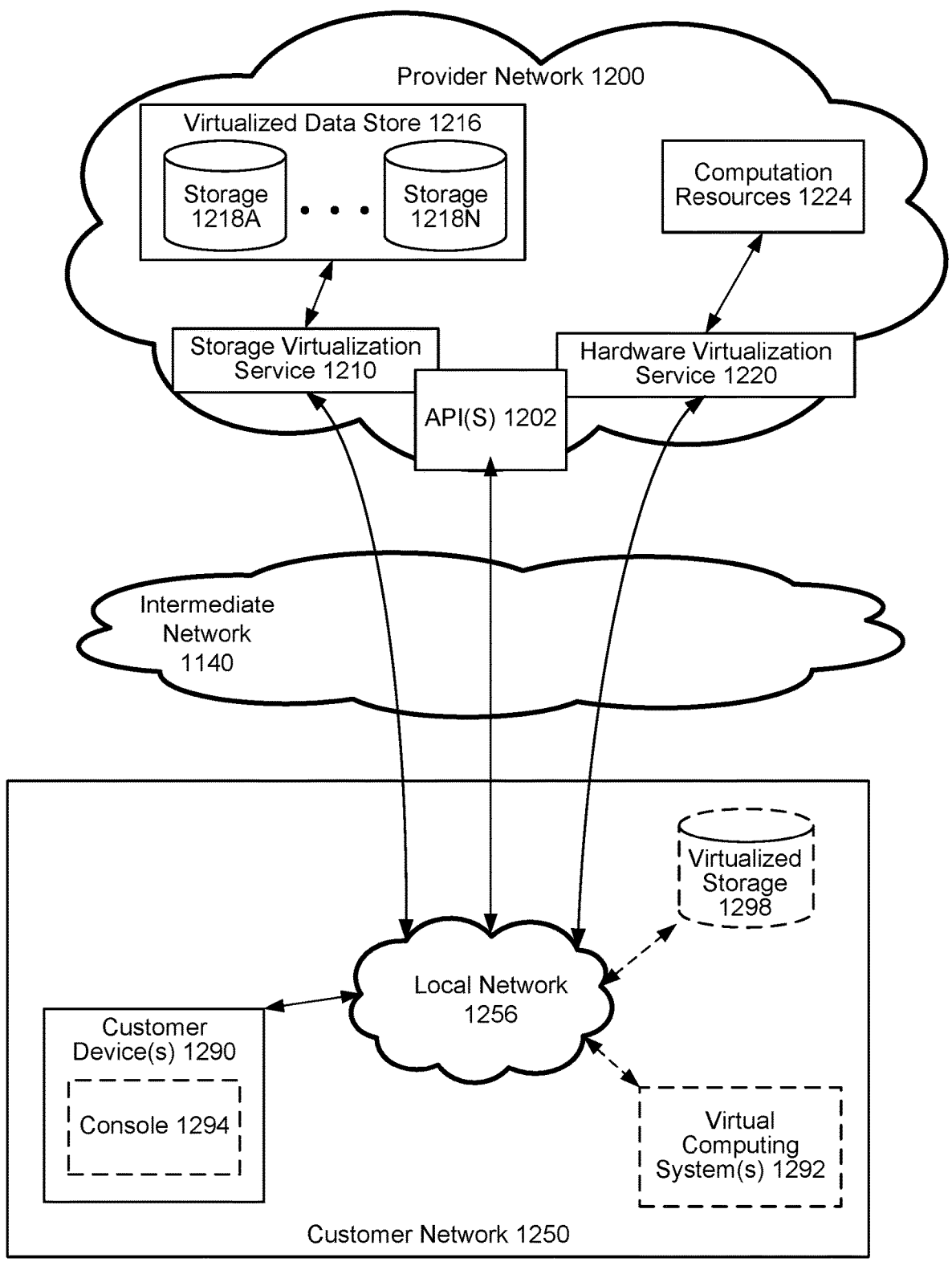
FIG. 12 is a block diagram of an example provider network that provides a storage virtualization service and a hardware virtualization service to customers according to some embodiments.

FIG. 12 is a block diagram of an example provider network that provides a storage virtualization service and a hardware virtualization service to customers, according to some embodiments. Hardware virtualization service 1220 provides multiple computation resources 1224 (e.g., VMs) to customers. The computation resources 1224 may, for example, be rented or leased to customers of the provider network 1200 (e.g., to a customer that implements customer network 1250). Each computation resource 1224 may be provided with one or more local IP addresses. Provider network 1200 may be configured to route packets from the local IP addresses of the computation resources 1224 to public Internet destinations, and from public Internet sources to the local IP addresses of computation resources 1224.

Provider network 1200 may provide a customer network 1250, for example coupled to intermediate network 1140 via local network 1256, the ability to implement virtual computing systems 1292 via hardware virtualization service 1220 coupled to intermediate network 1140 and to provider network 1200. In some embodiments, hardware virtualization service 1220 may provide one or more APIs 1202, for example a web services interface, via which a customer network 1250 may access functionality provided by the hardware virtualization service 1220, for example via a console 1294 (e.g., a web-based application, standalone application, mobile application, etc.). In some embodiments, at the provider network 1200, each virtual computing system 1292 at customer network 1250 may correspond to a computation resource 1224 that is leased, rented, or otherwise provided to customer network 1250.

From an instance of a virtual computing system 1292 and/or another customer device 1290 (e.g., via console 1294), the customer may access the functionality of storage virtualization service 1210, for example via one or more APIs 1202, to access data from and store data to storage resources 1218A-1218N of a virtual data store 1216 provided by the provider network 1200. In some embodiments, a virtualized data store gateway (not shown) may be provided at the customer network 1250 that may locally cache at least some data, for example frequently accessed or critical data, and that may communicate with virtualized data store service 1210 via one or more communications channels to upload new or modified data from a local cache so that the primary store of data (virtualized data store 1216) is maintained. In some embodiments, a user, via a virtual computing system 1292 and/or on another customer device 1290, may mount and access virtual data store 1216 volumes, which appear to the user as local virtualized storage 1298.

While not shown in FIG. 12, the virtualization service(s) may also be accessed from resource instances within the provider network 1200 via API(s) 1202. For example, a customer, appliance service provider, or other entity may access a virtualization service from within a respective virtual network on the provider network 1200 via an API 1202 to request allocation of one or more resource instances within the virtual network or within another virtual network.

Using an API 1202, a user may initiate evaluation of an updated component. For example, the user may provide data (e.g., data 610) related to processing by a first component (e.g., a baseline component) and data (e.g., data 620) related to processing by an updated component. The API 1202 may cause the evaluation component 630 to perform the functionalities described herein, including, determining an action to resolve an issue with the updated component, and perform the action to generate a second updated component. In some embodiments, the user may also provide an input to the API 1202 representing a type of action/resolution the user desires. For example, the user may choose from generating/updating a deterministic component (e.g., a FST or a MR), training of a statistical model, or other actions that may be available. In some cases, an issue may be resolved by performing more than action, and based on the user preference, the evaluation component 630 may select the appropriate action. In some embodiments, the user may provide an input to the API 1202 representing whether the user wants to receive a recommended action to resolve the issue (so the user can then later decide whether to apply that action or not), or the user wants to the system to perform the action to resolve the issue and generate a second updated component.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving first natural language understanding (NLU) processing data representing results of processing a first user input using a baseline NLU component, the first NLU processing data including first intent data representing a first intent associated with a first binned confidence value;
   receiving second NLU processing data representing results of processing the first user input using a first updated NLU component, the second NLU processing data including second intent data representing the first intent associated with a second binned confidence value;
   determining that the first binned confidence value is greater than the second binned confidence value;
   based on the first intent data and the second intent data representing the first intent and based on determining that the first binned confidence value is greater than the second binned confidence value, generating a second updated NLU component trained using a set of user inputs corresponding to the first user input, the set of user inputs represented as positive samples for training;
   associating a first evaluation identifier with the first updated NLU component and the second updated NLU component;
   receiving third NLU processing data representing results of processing the first user input using the second updated NLU component, the third NLU processing data including third intent data representing the first intent associated with a third binned confidence value;
   determining that the first binned confidence value is greater than the third binned confidence value;
   determining that the first user input is a frequently received user input;
   using the first evaluation identifier, determining that the second updated NLU component were generated in response to an issue with processing of the first user input using the first updated NLU component; and
   generating a first finite state transducer (FST) corresponding to the first user input and the first intent, the generating based on:
      the first intent data and the third intent data both representing the first intent,
      the first binned confidence value being greater than the third binned confidence value,
      the first user input being the frequently received user input, and
      the second updated NLU component being generated in response to the issue.

2. The computer-implemented method of claim 1, further comprising:
   receiving fourth NLU processing data representing results of processing a second user input using the baseline NLU component, the fourth NLU processing data indicating that the second user input was processed using a second FST;
   receiving fifth NLU processing data representing results of processing the second user input using a third updated NLU component, the fifth NLU processing data indicating that the second user input was processed using the second FST and a third FST;
   using first data corresponding to the baseline NLU component and second data corresponding to the third updated NLU component, determining that first slot data corresponding to the baseline NLU component was changed; and
   selecting to:
      add a slot value corresponding to the first slot data to a prohibited list,
      generate updated grammar data to exclude the first slot data from grammar data, or
      add second slot data representing the slot value.

3. The computer-implemented method of claim 1, further comprising:
   receiving fourth NLU processing data representing results of processing a second user input using the baseline NLU component, the fourth NLU processing data including fourth intent data representing a second intent associated with a fourth binned confidence value;
   receiving fifth NLU processing data representing results of processing the second user input using a third updated NLU component, the fifth NLU processing data including fifth intent data representing the second intent associated with a fifth binned confidence value;
   determining that the fifth binned confidence value is greater than the fourth binned confidence value;
   determining a receipt frequency corresponding to the second intent; and generating a FST corresponding to the second user input, the FST causing the second user input to be disassociated with the second intent.

4. A computer-implemented method comprising:
receiving first data corresponding to processing of a first user input using a first component comprising a first model and a second model, the first model being a statistical model, the second model being a non-statistical model), and the first data including first output data;
receiving second data corresponding to processing of the first user input using a first updated component comprising a third model and a fourth model, the third model being a statistical model and the fourth model being a non-statistical model, and the second data including second output data;
determining that processing of the first user input by the first updated component results in an undesired response;
using a database storing user inputs received, determining a number of times the first user input is received; and
determining a second updated component using the first updated component, the determining of the second updated component being based on processing of the first data with respect to the second data and the number of times.

5. The computer-implemented method of claim 4, further comprising:
determining that the first data indicates that the first model was invoked during processing of the first user input;
determining that the second data indicates that the third model was invoked during processing of the first user input;
processing the first output data with respect to the second output data;
based on the processing of the first output data with respect to the second output data, determining training data to include a set of user inputs corresponding to the first user input, the set of user inputs associated with a positive label; and
training, using the training data, the first updated component to determine the second updated component.

6. The computer-implemented method of claim 5, further comprising:
receiving third data representing processing of the first user input using the second updated component, the second updated component comprising a fourth model and a fifth model, the fourth model being a statistical model and the fifth model being a non-statistical model, the third data comprising third output data;
determining that processing of the first user input by the second updated component results in the undesired response;
determining that the third data indicates that the fourth model was invoked during processing of the first user input;
processing the first output data with respect to the third output data; and
generating a sixth model corresponding to the first user input, the sixth model being a finite state transducer (FST), the sixth model to be included in the second updated component.

7. The computer-implemented method of claim 4, further comprising:
determining that the first data indicates that the first model was invoked during processing of the first user input;
determining that the second data indicates that the third model was invoked during processing of the first user input;
processing the first output data with respect to the second output data;
based on the processing of the first output data with respect to the second output data, determining training data to include a set of user inputs corresponding to the first user input, the set of user inputs associated with a negative label; and
training, using the training data, the first updated component to determine the second updated component.

8. The computer-implemented method of claim 4, further comprising:
determining that the second data indicates that the fourth model and a fifth model of the first updated component was invoked during processing of the first user input, the fifth model being a non-statistical model;
determining that first slot data represented in the first output data is different than second slot data represented in the second output data; and
determine the second updated component by:
adding a slot value corresponding to the first slot data to a prohibited list; or
generating grammar data corresponding to the first updated component to exclude the first slot data.

9. The computer-implemented method of claim 4, further comprising:
determining that the second data indicates that the fourth model and a fifth model of the first updated component was invoked during processing of the first user input;
determining that first grammar data corresponding to the first component is different than second grammar data corresponding to the first updated component; and
generating the second updated component by:
adding a slot value corresponding to the first slot data to a prohibited list; or
generating updated grammar data using the first grammar data to exclude the first user input.

10. The computer-implemented method of claim 4, further comprising:
determining that the first data indicates that processing of the first user input by the first component invoked a first rule;
determining that the second data indicates that processing of the first user input by the first updated component invokes a component other than the first rule; and
determining the second updated component by:
generating an updated rule using the first rule to include the first user input;
generating a FST corresponding to the first user input to include in the second updated component; or
training the third model.

11. The computer-implemented method of claim 4, further comprising:
determining that processing of the first user input by the second updated component results in a desired response; and
storing the second updated component for processing of future user inputs.

12. The computer-implemented method of claim 4, further comprising:
determining the second updated component by:
generating a FST corresponding to the first user input,
generating a negative FST corresponding to the first user input, or
training the third model, wherein determining the second updated component is based on a domain corresponding to the first user input.

13. A system comprising:
at least one processor; and
at least one memory including instructions that, when executed by the at least one processor, cause the system to:
receive first data corresponding to processing of a first user input using a first component comprising a first model and a second model, the first model being a statistical model and the second model being a non-statistical model, the first data including first output data;
receive second data corresponding to processing of the first user input using a first updated component comprising third model and a fourth model, the third model being a statistical model and the fourth model being a non-statistical model, the first data including second output data;
determine that processing of the first user input by the first updated component results in an undesired response;
using a database storing user inputs received, determine a number of times the first user input is received; and
determining a second updated component using the first updated component, the determining of the second updated component being based on processing of the first data with respect to the second data and the number of times.

14. The system of claim 13, wherein the instructions that, when executed by the at least one processor, further cause the system to:
determine that the first data indicates that the first model was invoked during processing of the first user input;
determine that the second data indicates that the third model was invoked during processing of the first user input;
process the first output data with respect to the second output data;
based on processing of the first output data with respect to the second output data, determine training data to include a set of user inputs corresponding to the first user input, the set of user inputs associated with a positive label; and
train, using the training data, the first updated component to determine the second updated component.

15. The system of claim 14, wherein the instructions that, when executed by the at least one processor, further cause the system to:
receive third data representing processing of the first user input using the second updated component, the second updated component comprising of at least a fourth model and a fifth model, the fourth model being a statistical model and the fifth model being non-statistical model, the third data comprising third output data;
determine that processing of the first user input by the second updated component results in the undesired response;
determine that the third data indicates that the fourth model was invoked during processing of the first user input;
process the first output data with respect to the third output data; and
generate a sixth model corresponding to the first user input, the sixth model being a finite state transducer (FST), the sixth model to be included in the second updated component.

16. The system of claim 13, wherein the instructions that, when executed by the at least one processor, further cause the system to:
determine that the first data indicates that the first model was invoked during processing of the first user input;
determine that the second data indicates that the third model was invoked during processing of the first user input;
processing the first output data with respect to the second output data;
based on processing of the first output data with respect to the second output data, determine training data to include a set of user inputs corresponding to the first user input, the set of user inputs associated with a negative label; and
train, using the training data, the first updated component to determine second updated component.

17. The system of claim 13, wherein the instructions that, when executed by the at least one processor, further cause the system to:
determine that the second data indicates that the fourth model and a fifth model of the first updated component was invoked during processing of the first user input;
determine that first slot data represented in the first output data is different than second slot data represented in the second output data; and
determine the second updated component by:
adding a slot value corresponding to the first slot data to a prohibited list; or
generating grammar data corresponding to the first updated component to exclude the first slot data.

18. The system of claim 13, wherein the instructions that, when executed by the at least one processor, further cause the system to:
determine that the second data indicates that the fourth model and fifth model of the first updated component was invoked during processing of the first user input;
determine that first grammar data corresponding to the first component is different than second grammar data corresponding to the first updated component; and
determine the second updated component by:
adding a slot value corresponding to the first slot data to a prohibited list; or
generating updated grammar data using the first grammar data to exclude the first user input.

19. The system of claim 13, wherein the instructions that, when executed by the at least one processor, further cause the system to:
determine that the first data indicates that processing of the first user input by the first component invoked a first rule;
determine that the second data indicates that processing of the first user input by the first updated component invokes a component other than the first rule; and
determine the second updated component by:
generate an updated rule using the first rule to include the first user input;
generate a FST corresponding to the first user input to include in the second updated component; or
train the third model.

20. The system of claim 13, wherein the instructions that, when executed by the at least one processor, further cause the system to:
determine that processing of the first user input by the second updated component results in a desired response; and store the second updated component for processing of future user inputs.

\* \* \* \* \*